United States Patent
Zhang et al.

(10) Patent No.: US 10,420,004 B2
(45) Date of Patent: Sep. 17, 2019

(54) COMMUNICATION METHOD AND APPARATUS APPLIED TO HYPER CELL

(71) Applicant: Huawei Technologies Co., Ltd., Shenzhen, Guangdong (CN)

(72) Inventors: Hongping Zhang, Shanghai (CN); Qinghai Zeng, Shanghai (CN); Tingting Geng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/119,861

(22) Filed: Aug. 31, 2018

(65) Prior Publication Data

US 2018/0368046 A1 Dec. 20, 2018

Related U.S. Application Data

(63) Continuation of application No. PCT/CN2017/075372, filed on Mar. 2, 2017.

(30) Foreign Application Priority Data

Mar. 3, 2016 (CN) .......................... 2016 1 0122160

(51) Int. Cl.
- *H04W 36/38* (2009.01)
- *H04W 36/08* (2009.01)
- *H04W 36/30* (2009.01)
- *H04W 16/32* (2009.01)
- *H04L 5/00* (2006.01)

(52) U.S. Cl.
CPC ........... *H04W 36/38* (2013.01); *H04W 16/32* (2013.01); *H04W 36/08* (2013.01); *H04W 36/30* (2013.01); *H04L 5/0035* (2013.01); *H04L 5/0051* (2013.01)

(58) Field of Classification Search
CPC .... H04L 5/0035; H04L 5/0051; H04W 16/32; H04W 36/08; H04W 36/30; H04W 36/38
See application file for complete search history.

(56) References Cited

U.S. PATENT DOCUMENTS 9,325,475 B2 * 4/2016 Hoshino ................ H04B 7/024
2012/0071200 A1 3/2012 Bienas et al.
(Continued)

FOREIGN PATENT DOCUMENTS

| CN | 103052161 A | 4/2013 |
| CN | 103428723 A | 12/2013 |

(Continued)

OTHER PUBLICATIONS

Huawei Technologies, "Vision on 5G Radio Access Technologies", 3GPP RAN workshop on 5G, Sep. 17-18, 2015, 18 pages, XP051043758.

*Primary Examiner* — Margaret G Mastrodonato

(57) ABSTRACT

Embodiments of the present invention provide a communication method and apparatus applied to a hyper cell. The method includes: sending, by UE, an uplink reference signal; measuring, by a TP in the hyper cell, the uplink reference signal sent by the UE; and updating, by a radio access network controller based on a measurement report from the TP, a TP set that provides a communications service for the UE. According to the embodiments of the present invention, UE load and difficulty in mobility management in a hotspot area are reduced.

20 Claims, 13 Drawing Sheets

(56) References Cited

U.S. PATENT DOCUMENTS

| | | | |
|---|---|---|---|
| 2013/0166644 A1* | 6/2013 | Sun | H04L 5/0094 |
| | | | 709/204 |
| 2015/0141002 A1 | 5/2015 | Ma et al. | |
| 2015/0181492 A1 | 6/2015 | Schmidt et al. | |
| 2015/0195032 A1* | 7/2015 | Sharma | H04B 7/15557 |
| | | | 370/315 |
| 2015/0208263 A1* | 7/2015 | Behravan | H04B 7/024 |
| | | | 370/252 |
| 2017/0033904 A1* | 2/2017 | Stirling-Gallacher | |
| | | | H04L 5/0048 |
| 2017/0135097 A1* | 5/2017 | Yi | H04W 16/32 |
| 2018/0205418 A1 | 7/2018 | Zhang et al. | |

FOREIGN PATENT DOCUMENTS

| | | |
|---|---|---|
| CN | 105340315 A | 2/2016 |
| EP | 2384054 A1 | 11/2011 |
| EP | 2741539 A1 | 6/2014 |

* cited by examiner

COMMUNICATION METHOD AND APPARATUS APPLIED TO HYPER CELL

CROSS-REFERENCE TO RELATED APPLICATIONS

This application is a continuation of International Application No. PCT/CN2017/075372 filed on Mar. 2, 2017, which claims priority to Chinese Patent Application No. 201610122160.2 filed on Mar. 3, 2016. The disclosures of the aforementioned applications are hereby incorporated by reference in their entireties.

TECHNICAL FIELD

This application relates to the communications field, and more specifically, to a communication method and apparatus applied to a hyper cell.

BACKGROUND

In the prior art, to ensure service continuity of user equipment (UE), mobility management needs to be performed on the UE. For example, when moving from a coverage area of a source cell to a coverage area of a target cell, the UE needs to complete a handover between cells in a timely manner.

However, in an existing communications system, a design idea for mobility management is a design idea that UE follows a network (UE follows network). Using UE in an activated state as an example, to perform mobility management on the UE, each cell in a network sends a downlink reference signal for measurement performed by the UE. The UE reports a measurement result to a network side in a form of a measurement report, the network determines handover based on the measurement report from the UE, and the UE is handed over to a cell having a good signal condition, for data transmission.

However, in a subsequent evolution process of a mobile communications system, to meet a requirement on a huge amount of data communication, massive small cells (small cell) may be deployed in a hotspot area in a centralized manner. In this case, if the design idea that UE follows a network continues to be used, a problem that mobility management on UE is difficult is caused. For example, in a hotspot area, UE needs to measure massive small cells; this raises a relatively high requirement on a measurement capability of the UE. For another example, UE can be handed over only after performing measurement and reporting a measurement report, and due to a small coverage area of a small cell, the UE may quickly move out of the coverage area of the small cell. As a result, a handover may fail because the handover is not performed in a timely manner, for example, sending the measurement report to the small cell fails or sending a handover command fails. For still another example, because ultra dense cell deployment is performed, operations such as reporting a measurement report and performing a handover may cause massive air interface signaling, consuming massive air interface resources and massive network processing resources.

SUMMARY

This application provides a communication method applied to a hyper cell, a radio access network controller, user equipment, a transmission point, to resolve a problem that mobility management in a hotspot area is difficult.

According to a first aspect, a communication method applied to a hyper cell. The method includes: allocating, by a radio access network controller, a first transmission point (Transmission Point, TP) set and a second TP set for UE in a first hyper cell, where the first hyper cell includes a plurality of TPs, the first TP set and the second TP set each include at least one of the plurality of TPs, a TP in the first TP set is configured to measure an uplink reference signal sent by the UE, and a TP in the second TP set is configured to perform data communication with the UE; sending, by the radio access network controller, a first dedicated user equipment identity (Dedicated User Equipment Identity, DUI) of the UE to the UE, where the first DUI is used to identify the UE in the first hyper cell; receiving, by the radio access network controller, a measurement report sent by the TP in the first TP set, where the measurement report carries signal strength information of the uplink reference signal sent by the UE; and updating, by the radio access network controller, the second TP set based on the measurement report from the TP in the first TP set. Optionally, the radio access network controller may send the first DUI to the TP in the first TP set and/or the TP in the second TP set. Optionally, the TP in the first TP set may measure, based on the first DUI, the uplink reference signal sent by the UE. Optionally, the TP in the second TP set may perform data communication with the UE based on the first DUI. Optionally, the measurement report may be used to indicate strength or quality of the uplink reference signal sent by the UE.

In the prior art, a cell (or referred to as a network side) sends a downlink reference signal, UE measures the downlink reference signal from the cell and reports a measurement report, and the network side determines cell handover based on the measurement report from the UE, so as to implement mobility management on the UE. In this solution of this application, the radio access network controller allocates the first TP set and the second TP set for the UE, where the second TP set may be used for transmitting data of the UE, the first TP set may be configured to measure the uplink reference signal sent by the UE, and the radio access network controller updates the second TP set based on the measurement report from the TP from the first TP set. In other words, in this solution of this application, a reference-signal sending party changes to the UE, a reference-signal measurement party changes to a TP in the hyper cell, and with movement of the UE, the network side continuously updates the second TP set used for transmitting the data of the UE. However, from a perspective of the UE, the UE is not clearly aware of a network change, and does not need to perform a complex measurement or reporting operation, reducing complexity for the UE. In addition, excessive air interface signaling interaction between the UE and a TP is not required in an entire process, saving an air interface resource, and further resolving a problem that mobility management is difficult in a hotspot area.

With reference to the first aspect, in a first implementation of the first aspect, before the allocating, by a radio access network controller, a first TP set and a second TP set for UE in a first hyper cell, the method further includes: determining, by the radio access network controller, that a working mode of the UE is a no-cell mode, where working modes supported by the UE include a cell mode and the no-cell mode; and the cell mode is a working mode in which mobility management is performed based on downlink reference signal measurement performed by the UE, and the no-cell mode is a working mode in which mobility management is performed by measuring the uplink reference signal sent by the UE. Alternatively, the cell mode is a working mode in which mobility management is performed by a network side based on a measurement result obtained by measuring, by the UE, a downlink reference signal sent by the network side, and the no-cell mode is a working mode in which mobility management is performed by the network side based on a measurement result obtained by measuring the uplink reference signal sent by the UE.

A plurality of working modes including the cell mode and the no-cell mode are set for the UE, and this can provide better compatibility with the prior art (to be specific, compatibility with the cell mode).

With reference to the first implementation of the first aspect, in a second implementation of the first aspect, the determining, by the radio access network controller, that a working mode of the UE is a no-cell mode includes: after the UE initiates a random access process by using a TP in the first hyper cell, receiving, by the radio access network controller, request information sent by the TP in the first hyper cell, where the request information is used to request the radio access network controller to determine the working mode of the UE, and the request information includes at least one of the following parameters of the UE: a type of the UE, a movement speed of the UE, a location of the UE, a service of the UE, the working modes supported by the UE, and a capability of the UE; and determining, by the radio access network controller based on the parameter of the UE that is carried in the request information, that the working mode of the UE is the no-cell working mode; and the method further includes: sending, by the radio access network controller to the UE and the TP in the second TP set, information used to indicate that the working mode of the UE is the no-cell mode. For example, if the request information carries information that the UE supports the no-cell mode, the radio access network controller determines that the working mode of the UE is the no-cell mode. For another example, if the request information carries the location of the UE, the radio access network controller determines, based on the location of the UE, whether the UE is located in a hotspot area, and when the UE is located in the hotspot area, determines that the working mode of the UE is the no-cell mode.

With reference to either the first or the second implementation of the first aspect, in a third implementation of the first aspect, the method further includes: determining, by the radio access network controller based on the measurement report from the TP in the first TP set, to change the working mode of the UE to the cell mode; and sending, by the radio access network controller, a mode change message to the UE, where the mode change message is used to instruct the UE to change from the no-cell mode to the cell mode, and the mode change message includes a cell identifier of a serving cell for the UE in the cell mode. Specifically, the determining, by the radio access network controller based on the measurement report from the TP in the first TP set, to change the working mode of the UE to the cell mode may include: when detecting that the TP that sends the measurement report is located at an edge of the hyper cell, that is, the UE is to leave the hyper cell, changing, by the radio access network controller, the working mode of the UE to the cell mode.

In this implementation, the radio access network controller selects a proper working mode for the UE based on the measurement report from the TP in the first TP set. This implements a flexible change of the UE between the cell mode and the no-cell mode.

With reference to any one of the first aspect or the first to the third implementations of the first aspect, in a fourth implementation of the first aspect, there is a correspondence between the first DUI and a time-frequency resource occupied by the uplink reference signal; and the method further includes: sending, by the radio access network controller, the first DUI to the TP in the first TP set, so that the TP in the first TP set determines the time-frequency resource based on the first DUI and detects the uplink reference signal from the UE on the time-frequency resource.

The correspondence between the first DUI and the time-frequency resource occupied by the uplink reference signal is pre-established, and when receiving the first DUI, the UE can conveniently determine, based on the first DUI, the time-frequency resource for sending the uplink reference signal. This simplifies a manner of determining the time-frequency resource occupied by the uplink reference signal.

With reference to any one of the first aspect or the first to the fourth implementations of the first aspect, in a fifth implementation of the first aspect, the method further includes: updating, by the radio access network controller, the first TP set based on the measurement report from the TP in the first TP set.

The radio access network controller configures the first TP set for the UE, and continuously maintains and updates the first TP set used for the UE based on a measurement report from the first TP set, that is, a task of measuring quality of a reference signal is transferred to a network side from a UE side, and mobility management is performed on the UE in a manner of updating the first TP set. This simplifies implementation by UE.

With reference to the fifth implementation of the first aspect, in a sixth implementation of the first aspect, the method further includes: after the UE enters a power saving state, continuing, by the radio access network controller, to update the first TP set based on the measurement report from the TP in the first TP set, and skipping updating the second TP set.

Because the UE in the power saving state does not need a data communications service or needs only a few data communications services, the radio access network controller can maintain only the first TP set used for the UE in the power saving state, but does not maintain the second TP set used for the UE. This can save a resource on a network side.

With reference to any one of the first aspect or the first to the sixth implementations of the first aspect, in a seventh implementation of the first aspect, the method further includes: determining, by the radio access network controller based on the measurement report from the TP in the first TP set, that the UE arrives at an edge of a second hyper cell; instructing, by the radio access network controller, a TP in the second hyper cell to measure the uplink reference signal; determining, by the radio access network controller, to hand over the UE to the second hyper cell based on a measurement report obtained by measuring the uplink reference signal by the TP in the second hyper cell (the measurement report obtained by measuring the uplink reference signal by the TP in the second hyper cell is used to indicate strength or quality of the uplink reference signal); and sending, by the radio access network controller, a handover command to the UE, where the handover command is used to instruct to hand over the UE to the second hyper cell, the handover command includes a second DUI, and the second DUI is used to identify the UE in the second hyper cell; and the determining, by the radio access network controller based on the measurement report from the TP in the first TP set, that the UE arrives at an edge of a second hyper cell may include: when finding that quality of the uplink reference signal that is indicated by a measurement report from a TP located at the edge of the second hyper cell is higher than a preset threshold, determining, by the radio access network controller, that the UE arrives at the edge of the second hyper cell; or when finding that a ratio of a TP in TPs for sending measurement reports that is located at the edge of the second hyper cell, in total TPs in the first TP set exceeds a preset threshold, determining, by the radio access network controller, that the UE arrives at the edge of the second hyper cell.

In this implementation, the radio access network controller implements a UE handover between hyper cells based on the measurement report from the TP in the first TP set.

With reference to any one of the first aspect or the first to the seventh implementations of the first aspect, in an eighth implementation of the first aspect, the method further includes: after the UE enters the power saving state, sending, by the radio access network controller, a paging message to the UE; and receiving, by the radio access network controller, a paging response message on a target uplink resource, where the target uplink resource is an uplink resource preconfigured for the UE that has entered the power saving state, so that the UE enters an activated state from the power saving state by using the target uplink resource.

With reference to any one of the first aspect or the first to the eighth implementations of the first aspect, in a ninth implementation of the first aspect, the method further includes: after the UE enters the power saving state, sending, by the radio access network controller, the paging message to the UE in a fixed paging frequency band, where the fixed paging frequency band is a frequency band that is used to send the paging message and that is configured for a network in which the first hyper cell is located, or the fixed paging frequency band is a frequency band that is used to send the paging message and that is configured for the first hyper cell.

The fixed paging frequency band is set, with no need to configure a corresponding paging frequency band for the UE in the power saving state. This simplifies a manner of paging the UE in the power saving state that is in the hyper cell.

According to a second aspect, a communication method applied to a hyper cell is provided, including: receiving, by UE in a first hyper cell, a first DUI allocated by a radio access network controller for the UE, where the first hyper cell includes a plurality of TPs, the first DUI is used to identify the UE in the first hyper cell, the radio access network controller allocates, for the UE, a first TP set and a second TP set from the plurality of TPs, a TP in the second TP set is configured to perform data communication with the UE, and a TP in the first TP set is configured to measure an uplink reference signal sent by the UE; and sending, by the UE, an uplink reference signal based on the first DUI, so that the radio access network controller updates the second TP set based on a measurement report obtained by measuring the uplink reference signal by the TP in the first TP set, where the measurement report carries signal strength information of the uplink reference signal sent by the UE. Optionally, in an implementation, the sending, by the UE, an uplink reference signal based on the first DUI may include: sending, by the UE to a network side, the uplink reference signal scrambled by using the first DUI; or sending, by the UE to a network side, the uplink reference signal corresponding to the first DUI (a correspondence between the first DUI and the uplink reference signal may be pre-established).

Mobility management is performed on the UE by measuring, by the TP, the uplink reference signal sent by the UE and updating the second TP set used for the UE by the radio access network controller based on the measurement report from the TP. This resolves a problem that mobility management is difficult in a hotspot area.

With reference to the second aspect, in a first implementation of the second aspect, a working mode of the UE is a no-cell mode; working modes supported by the UE include a cell mode and the no-cell mode; and the cell mode is a working mode in which mobility management is performed based on downlink reference signal measurement performed by the UE, and the no-cell mode is a working mode in which mobility management is performed by measuring the uplink reference signal sent by the UE.

A plurality of working modes including the cell mode and the no-cell mode are set for the UE, and this can provide better compatibility with the prior art (to be specific, compatibility with the cell mode).

With reference to the first implementation of the second aspect, in a second implementation of the second aspect, the method further includes: after the UE initiates a random access process by using a TP in the first hyper cell, sending, by the UE, a parameter of the UE to the TP in the first hyper cell, so that the TP in the first hyper cell sends the parameter of the UE to the radio access network controller, and the radio network controller determines the working mode of the UE based on the parameter of the UE, where the parameter of the UE includes at least one of a type of the UE, a movement speed of the UE, a location of the UE, a service of the UE, the working modes supported by the UE, and a capability of the UE; and receiving, by the UE, information that is sent by the radio access network controller and that is used to indicate that the working mode of the UE is the no-cell mode.

With reference to either the first or the second implementation of the second aspect, in a third implementation of the second aspect, the method further includes: receiving, by the UE, a mode change message sent by the radio access network controller, where the mode change message is used to instruct the UE to change from the no-cell mode to the cell mode, and the mode change message includes a cell identifier of a serving cell for the UE in the cell mode; determining, by the UE, the serving cell based on the cell identifier; and performing, by the UE, data transmission by using the serving cell.

With reference to any one of the second aspect or the first to the third implementations of the second aspect, in a fourth implementation of the second aspect, there is a correspondence between the first DUI and a time-frequency resource occupied by the uplink reference signal; before the sending, by the UE, an uplink reference signal, the method further includes: determining, by the UE, the time-frequency resource based on the first DUI by using the correspondence; and the sending, by the UE, an uplink reference signal includes: sending, by the UE, the uplink reference signal on the time-frequency resource.

The correspondence between the first DUI and the time-frequency resource occupied by the uplink reference signal is pre-established, and when receiving the first DUI, the UE can conveniently determine, based on the first DUI, the time-frequency resource for sending the uplink reference signal. This simplifies a manner of determining the time-frequency resource occupied by the uplink reference signal.

With reference to any one of the second aspect or the first to the fourth implementations of the second aspect, in a fifth implementation of the second aspect, the method further includes: receiving, by the UE, a handover command sent by the radio access network controller, where the handover command is used to instruct to hand over the UE to a second hyper cell, the handover command includes a second DUI, and the second DUI is used to identify the UE in the second hyper cell.

With reference to any one of the second aspect or the first to the fifth implementations of the second aspect, in a sixth implementation of the second aspect, the method further includes: after the UE enters a power saving state, receiving, by the UE, a paging message sent by the radio access network controller, and sending, by the UE, a paging response message on a target uplink resource, to resume from the power saving state to an activated state, where the target uplink resource is an uplink resource preconfigured for the UE in the power saving state.

With reference to any one of the second aspect or the first to the sixth implementations of the second aspect, in a seventh implementation of the second aspect, the method further includes: after the UE enters the power saving state, receiving, by the UE in a fixed paging frequency band, the paging message sent by the radio access network controller, where the fixed paging frequency band is a frequency band that is used to send the paging message and that is configured for a network in which the first hyper cell is located, or the fixed paging frequency band is a frequency band that is used to send the paging message and that is configured for the first hyper cell.

The fixed paging frequency band is set, with no need to configure a corresponding paging frequency band for the UE in the power saving state. This simplifies a manner of paging the UE in the power saving state that is in the hyper cell.

According to a third aspect, a communication method applied to a hyper cell is provided, including: measuring, by a target TP in a first hyper cell, an uplink reference signal sent by UE in the first hyper cell, where the first hyper cell includes a plurality of TPs, the target TP is any TP in the plurality of TPs, a radio access network controller allocates a first DUI for the UE in the first hyper cell and allocates, for the UE, a first TP set and a second TP set from the plurality of TPs, the first DUI is used to identify the UE in the first hyper cell, a TP in the first TP set is configured to measure the uplink reference signal sent by the UE, a TP in the second TP set is configured to perform data communication with the UE, and the target TP is a TP in the first TP set; generating, by the target TP, a measurement report based on a result of measuring the uplink reference signal sent by the UE, where the measurement report carries signal strength information of the uplink reference signal that is sent by the UE and that is measured by the target TP; and sending, by the target TP, the measurement report to the radio access network controller, so that the radio access network controller updates the second TP set based on the measurement report.

Mobility management is performed on the UE by measuring, by the TP, the uplink reference signal sent by the UE and updating the second TP set used for the UE by the radio access network controller based on the measurement report from the TP. This resolves a problem that mobility management is difficult in a hotspot area.

With reference to the third aspect, in a first implementation of the third aspect, a working mode of the UE is a no-cell mode; working modes supported by the UE include a cell mode and the no-cell mode; and the cell mode is a working mode in which mobility management is performed based on downlink reference signal measurement performed by the UE, and the no-cell mode is a working mode in which mobility management is performed by measuring the uplink reference signal sent by the UE.

A plurality of working modes including the cell mode and the no-cell mode are set for the UE, and this can provide better compatibility with the prior art (to be specific, compatibility with the cell mode).

With reference to the first implementation of the third aspect, in a second implementation of the third aspect, the method further includes: after the UE initiates a random access process by using the target TP, receiving, by the target TP, a parameter of the UE from the UE, where the parameter of the UE includes at least one of a type of the UE, a movement speed of the UE, a location of the UE, a service of the UE, the working modes supported by the UE, and a capability of the UE; sending, by the target TP, the parameter of the UE to the radio access network controller, so that the radio access network controller determines the working mode of the UE based on the parameter of the UE; and receiving, by the target TP, information that is sent by the radio access network controller and that is used to indicate that the working mode of the UE is the no-cell mode.

With reference to any one of the third aspect or the first and the second implementations of the third aspect, in a third implementation of the third aspect, there is a correspondence between the first DUI and a time-frequency resource occupied by the uplink reference signal; the method further includes: receiving, by the target TP, the first DUI sent by the radio access network controller; and the detecting, by a target TP in a first hyper cell, an uplink reference signal sent by UE in the first hyper cell includes: determining, by the target TP, the time-frequency resource based on the first DUI by using the correspondence; and detecting, by the target TP, the uplink reference signal on the time-frequency resource.

The correspondence between the first DUI and the time-frequency resource occupied by the uplink reference signal is pre-established, and when receiving the first DUI, the UE can conveniently determine, based on the first DUI, the time-frequency resource for sending the uplink reference signal. This simplifies a manner of determining the time-frequency resource occupied by the uplink reference signal.

With reference to any one of the third aspect or the first to the third implementations of the third aspect, in a fourth implementation of the third aspect, the target TP is a TP in the second TP set, and the method further includes: receiving, by the target TP, the first DUI sent by the radio network controller; and performing, by the target TP, data communication with the UE based on the first DUI.

With reference to the fourth implementation of the third aspect, in a fifth implementation of the third aspect, the performing, by the target TP, data communication with the UE based on the first DUI includes: receiving, by the target TP, downlink data of the UE from a data anchor, where the data anchor is configured to encrypt the downlink data of the UE; and sending, by the target TP to the UE, the downlink data encrypted by using the data anchor.

The data anchor is set, and the data anchor is configured to encrypt the data of the UE. This ensures security of data communication in a hyper cell.

With reference to the fifth implementation of the third aspect, in a sixth implementation of the third aspect, receiving, by the target TP, a notification message sent by the radio access network controller, where the notification message is used to notify that the target TP has been deleted from the second TP set used for the UE; determining, by the target TP, whether there is downlink data of the UE that is not sent successfully; and when there is the downlink data not sent successfully, sending, by the target TP to the data anchor, the downlink data not sent successfully, so that the data anchor forwards, to the UE by using another TP in the second TP set, the downlink data not sent successfully.

With reference to any one of the third aspect or the first to the sixth implementations of the third aspect, in a seventh implementation of the third aspect, the method further includes: receiving, by the target TP, first instruction information sent by the radio access network controller, where the first instruction information is used to instruct the radio access network controller to delete the target TP from the first TP set; and stopping, by the target TP, measuring the uplink reference signal sent by the UE.

With reference to any one of the third aspect or the first to the seventh implementations of the third aspect, in an eighth implementation of the third aspect, the method further includes: receiving, by the target TP, second instruction information from the radio access network controller, where the second instruction information is used to instruct the radio access network controller to add the target TP to the second TP set; and performing, by the target TP, data communication with the UE.

With reference to the eighth implementation of the third aspect, in a ninth implementation of the third aspect, the method further includes: receiving, by the target TP, third instruction information from the radio access network controller, where the third instruction information is used to instruct the radio access network controller to delete the target TP from the second TP set.

According to a fourth aspect, a radio access network controller is provided, where the radio access network controller includes modules configured to perform the method in the first aspect.

According to a fifth aspect, UE is provided, where the UE includes modules configured to perform the method in the second aspect.

According to a sixth aspect, a TP is provided, where the TP includes modules configured to perform the method in the third aspect.

According to a seventh aspect, a radio access network controller is provided, where the radio access network controller includes a memory, a processor, and a transceiver; the memory is configured to store a program; the processor is configured to execute the program; the transceiver is configured to communicate with a TP in a hyper cell; and when the program is executed, the processor performs the method in the first aspect.

According to an eighth aspect, UE is provided, where the UE includes a memory, a processor, and a transceiver; the memory is configured to store a program; the processor is configured to execute the program; the transceiver is configured to communicate with a TP in a hyper cell; and when the program is executed, the processor is configured to perform the method in the second aspect.

According to a ninth aspect, a TP is provided, where the TP includes a memory, a processor, and a transceiver; the memory is configured to store a program; the processor is configured to execute the program; the transceiver is configured to communicate with UE in the hyper cell and a radio access network controller; and when the program is executed, the processor is configured to perform the method in the third aspect.

According to a tenth aspect, a communications system is provided, including the radio access network controller described in the fourth aspect, the UE described in the fifth aspect, and the TP described in the sixth aspect.

According to an eleventh aspect, a communications system is provided, including the radio access network controller described in the fourth aspect and the TP described in the sixth aspect.

According to a twelfth aspect, a communications system is provided, including the radio access network controller described in the seventh aspect, the UE described in the eighth aspect, and the TP described in the ninth aspect.

According to a thirteenth aspect, a communications system applied to a hyper cell is provided, including the radio access network controller described in the seventh aspect and the TP described in the ninth aspect.

According to a fourteenth aspect, a system chip is provided, including an input interface, an output interface, at least one processor, and a memory, where the input interface, the output interface, the processor, and the memory are connected by using a bus, the processor is configured to execute code in the memory, and when the code is executed, the processor implements the method in the first aspect.

According to a fifteenth aspect, a system chip is provided, including an input interface, an output interface, at least one processor, and a memory, where the input interface, the output interface, the processor, and the memory are connected by using a bus, the processor is configured to execute code in the memory, and when the code is executed, the processor implements the method in the second aspect.

According to a sixteenth aspect, a system chip is provided, including an input interface, an output interface, at least one processor, and a memory, where the input interface, the output interface, the processor, and the memory are connected by using a bus, the processor is configured to execute code in the memory, and when the code is executed, the processor implements the method in the third aspect.

According to a seventeenth aspect, a computer readable medium is provided, where the computer readable medium is configured to store program code to be executed by a radio access network controller, and the program code includes an instruction used to perform the method in the first aspect.

According to an eighteenth aspect, a computer readable medium is provided, where the computer readable medium is configured to store program code to be executed by UE, and the program code includes an instruction used to perform the method in the second aspect.

According to a nineteenth aspect, a computer readable medium is provided, where the computer readable medium is configured to store program code to be executed by a TP, and the program code includes an instruction used to perform the method in the third aspect.

In some implementations, the network side may be an access network side, and may include a TP, a radio access network controller, and the like.

In some implementations, the first hyper cell includes a plurality of cells.

In some implementations, the second TP set is a subset of the first TP set.

In some implementations, the first DUI is used by the TP in the first TP set to receive the uplink reference signal sent by the UE, and/or the first DUI is used to perform data communication between the TP in the second TP set and the UE.

The second TP set is set as a subset of the first TP set, and the second TP set is dynamically updated with dynamic update of the first TP set. This simplifies a manner of updating and maintaining a plurality of TP sets by a network side.

In some implementations, updating the first TP set may be updating a member in the first TP set; or updating the first TP set may be at least one of the following: deleting a TP from the first TP set and adding a TP to the first TP set. Similarly, updating the second TP set may be updating a member in the second TP set; or updating the second TP set may be at least one of the following: deleting a TP from the second TP set and adding a TP to the second TP set.

In some implementations, that the first DUI is used to identify the UE in the first hyper cell may mean that the first DUI is used by the TP in the first hyper cell to identify the UE, for example, in the first hyper cell, both uplink/downlink data of the UE and the uplink reference signal from the UE may be scrambled by using the first DUI. That the second DUI is used to identify the UE in the second hyper cell may mean that the second DUI is used by the TP in the second hyper cell to identify the UE, for example, in the second hyper cell, both uplink/downlink data of the UE and the uplink reference signal from the UE may be scrambled by using the second DUI. In addition, the first DUI may be used to uniquely identify the UE in the first hyper cell, and the second DUI may be used to uniquely identify the UE in the second hyper cell. Specifically, the DUI may be any one of or any combination of identifiers such as a C-RNTI, a hyper cell ID, a TP ID, a cell ID, and a newly defined ID.

In some implementations, the no-cell mode supported by the UE may also be referred to as an abnormal-cell mode or a hyper-cell mode, and the cell mode supported by the UE may also be referred to as a normal-cell (normal cell) mode. In the normal-cell mode, the network side may perform mobility management on the UE based on a UE handover between serving cells. In the hyper-cell mode, the network side performs mobility management on the UE in a hyper cell based on a TP set (the first TP set and/or the second TP set) for the UE.

TP frequency bands in a same hyper cell or in different hyper cells may differ. Therefore, based on a principle that a network is transparent to UE as much as possible, two anchor frequency bands may be introduced in some implementations:

Anchor frequency band 1: is used by the UE to receive paging, perform downlink synchronization, and/or the like; and herein, for ease of description, is referred to as a paging (paging) frequency band (or referred to as a downlink synchronization band).

Anchor frequency band 2: is used by the UE to send an uplink reference signal, where a same frequency band can be monitored by TPs in different frequency bands; and herein, for ease of description, is referred to as a reference signal frequency band.

The two frequency bands may "remain unchanged". For example, the two frequency bands may be used throughout the entire network, regardless of wherever the UE in the network moves. Alternatively, the two frequency bands may be fixed in a specified range. For example, in a no-cell mode, the network sends configuration information of anchor frequency bands to the UE. An advantage brought by introduction of the anchor frequency bands is that, the UE does not need to care about a frequency band of a surrounding network even when the UE moves, and the UE only needs to do two things: One is to listen to whether the UE has its own paging in a "fixed" paging frequency band, or optionally, to perform downlink synchronization based on a paging frequency band, so as to send the paging in a reference signal frequency band; the other is to send an uplink reference signal in a "fixed" reference signal frequency band. It should be noted that the mechanism of the anchor frequency bands is also applicable to communication between the UE in an activated state and the network. A manner of sending the uplink reference signal by the UE in a power saving state may be: periodically sending the uplink reference signal, or sending the uplink reference signal after it is detected that the UE moves a specified distance, so as to save power; or a combination thereof, that is, sending the uplink reference signal after it is detected that the UE moves a specified distance, and sending the uplink reference signal after a period expires.

In this application, mobility management is performed on the UE by sending the uplink reference signal by the UE and performing measurement by the network side, and the network side maintains and updates, for the UE, the second TP set used by the UE to perform data transmission (or data communication). This reduces UE load and difficulty in mobility management in a hotspot area.

DETAILED DESCRIPTION

It should be understood that the technical solutions of the present invention may be applied to various communications systems, such as a Global System for Mobile Communications (GSM), a Code Division Multiple Access (CDMA) system, a Wideband Code Division Multiple Access (WCDMA) system, a general packet radio service (GPRS) system, a Long Term Evolution (LTE) system, a Long Term Evolution Advanced (LTE-A) system, a Universal Mobile Telecommunications System (UMTS) system, and a 5G system.

It should be further understood that in the embodiments of the present invention, user equipment (UE) includes but is not limited to a mobile station (Mobile Station, MS), a mobile terminal, a mobile telephone, a handset, portable equipment, or the like. The user equipment may communicate with one or more core networks by using a radio access network (RAN). For example, the user equipment may be a mobile telephone (or referred to as a "cellular" telephone) or a computer having a wireless communication function; or the user equipment may be a portable mobile apparatus, a pocket-sized mobile apparatus, a handheld mobile apparatus, a computer built-in mobile apparatus, or an in-vehicle mobile apparatus.

Figure 1:
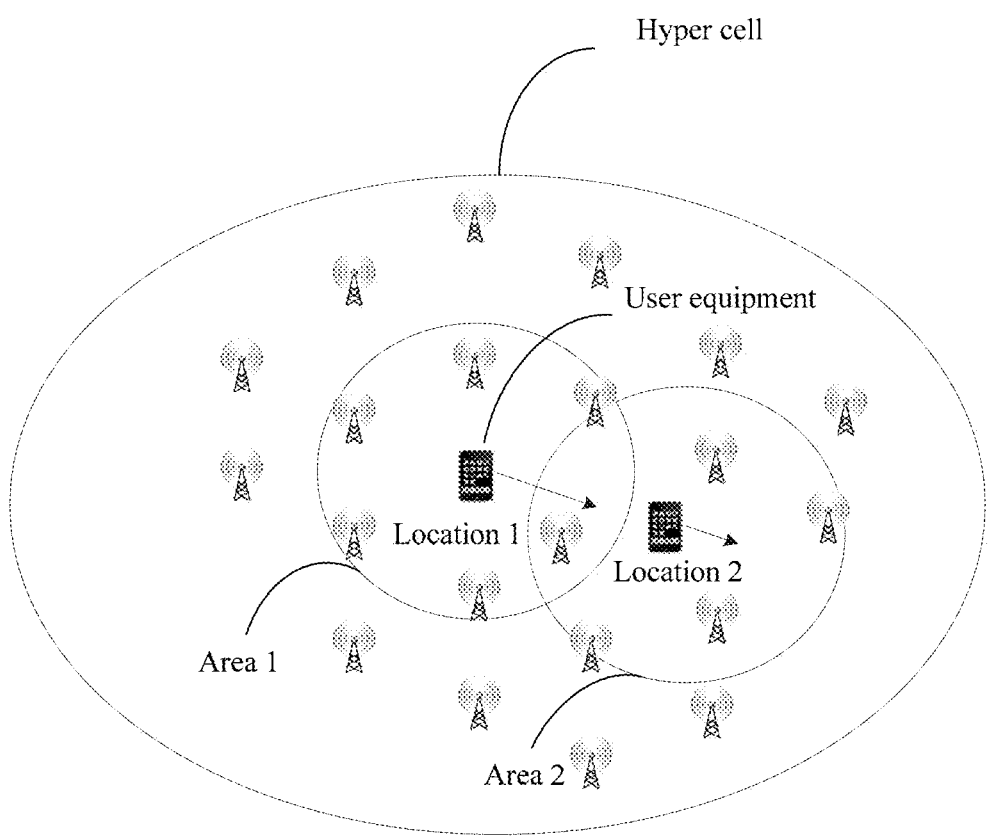
FIG. 1 is a schematic diagram of a scenario of a hyper cell according to an embodiment of the present invention.

As shown in FIG. 1, a hyper cell ID may be configured for a hyper cell. The hyper cell may include a plurality of intra-frequency and/or inter-frequency TPs (optionally, in an embodiment, the hyper cell may include only one TP); or the hyper cell may include a plurality of cells (optionally, in an embodiment, the hyper cell may include only one cell). It can be understood that an ID of a TP (or a cell) in the hyper cell may keep the same as the hyper cell ID, or both are configured separately. UE moves in the hyper cell, and if a prior-art mobility management mode is still used, the UE performs frequent cell handovers because each TP is corresponding to one or more cells (or small cells). In this embodiment of the present invention, same common information may usually be configured for TPs in the hyper cell, for example, same content is sent over channels such as a synchronization channel, a downlink reference channel, and a broadcast channel. When the UE moves in the hyper cell, the UE is unaware of a serving cell change because the TPs in the hyper cell have same common information. For example, specifically the UE does not need to measure a downlink reference signal sent by each cell in the hyper cell. On the contrary, the UE sends an uplink reference signal, and a network side measures the uplink reference signal from the UE, and selects, based on a measurement result, one or more TPs for the UE for data transmission. To be specific, in a process in which the UE moves in the hyper cell, the network side may complete tasks of uplink reference signal measurement and a TP change, so that the UE is unaware of the TP change as much as possible. This is equivalent to that a working mode "no cell" is introduced. In this way, not only service continuity can be ensured, but also air interface signaling overheads can be reduced. In addition, the UE does not need to undertake burdensome measurement tasks; design complexity is correspondingly reduced.

It should be understood that the working mode "no cell" may refer to: The UE is responsible for sending an uplink reference signal, and the network side continuously updates and maintains a TP that provides a data communications service for the UE, so that the UE is unaware of a TP change as much as possible. It should be understood that the "cell" herein is a normal cell in the prior art, and the working mode "no cell" in this application may also be referred to as a hyper-cell working mode.

In the hyper cell, a DUI may be allocated for the UE, and the hyper cell may identify the UE based on the DUI. For example, a TP in the hyper cell may provide a data communications service for the UE based on the DUI; and the TP in the hyper cell may further measure, based on the DUI, the uplink reference signal sent by the UE. Specifically, the DUI may be any one of or any combination of identifiers such as a C-RNTI, a hyper cell ID, a TP ID, a cell ID, and a newly defined ID.

It should be understood that no limitation is imposed on a specific type of the TP in this embodiment of the present invention. For example, the TP may be a normal base station (for example, a NodeB or an eNB), may be a remote radio module, may be a pico base station, or may be a relay (relay) or any other radio access device.

Optionally, in an embodiment, the TP may report, to a RAN controller, whether the TP supports a no-cell capability, and the RAN controller performs no-cell configuration on a TP supporting the no-cell capability. The "no-cell capability" herein may be various capabilities required when the TP works in the hyper cell, for example, a capability of measuring the uplink reference signal sent by the UE.

Descriptions are provided by using a manner of configuring the capability, supported by the TP, of measuring the uplink reference signal as an example. First, the RAN controller may send measurement configuration signaling (or referred to as measurement control signaling) to the TP. Specifically, the measurement configuration signaling may be used to configure at least one of the following measurement configuration parameters: a DUI, an uplink reference signal configuration, a measurement identifier, a measurement event name, a measurement interval, a measurement report reporting mode, a measurement reporting condition, and a measurement parameter. In addition, a set of measurement configuration parameters may be configured for each DUI (or each UE), or a set of measurement configuration parameters may be configured for all DUIs (or all UEs) in the hyper cell. Further, the measurement parameter may include at least one of uplink reference signal received quality, an uplink reference signal received power, a signal to noise ratio, a signal to interference plus noise ratio, a path loss, and the like. The measurement configuration parameters may further include at least one of thresholds of the foregoing parameters. When a measurement parameter detected by the TP meets the measurement reporting condition, the TP sends a measurement report, where the measurement report includes a corresponding measurement result. The measurement report reporting mode may include at least one of an event triggered reporting mode, a periodic reporting mode, and a mode of combining event triggered reporting with periodic reporting. The event triggered reporting mode may mean that when the uplink reference signal measured by the TP meets a threshold in the measurement configuration parameters, the TP sends a measurement report to the RAN controller. The periodic reporting mode may mean that the TP periodically sends a measurement report to the RAN controller.

After the RAN controller configures a measurement configuration parameter of the uplink reference signal for the TP, the TP can measure, based on the measurement configuration parameter, the uplink reference signal sent by the UE, and report a measurement result to the RAN controller based on the measurement reporting mode.

It should be noted that the measurement configuration signaling may instruct the TP to perform intra-frequency measurement, or may instruct the TP to perform inter-frequency measurement. Alternatively, the RAN controller may send measurement configuration signaling for intra-frequency measurement to the TP, or may send measurement configuration signaling for inter-frequency measurement to the TP. Specifically, assuming that a working frequency of the TP is F1, and a frequency at which the UE sends a reference signal is F2, the RAN controller may instruct the TP to perform inter-frequency measurement, to be specific, instruct the TP to measure, at F2, an uplink reference signal sent by the UE. Alternatively, in another implementation, the RAN controller may instruct the UE to send an uplink reference signal at a working frequency of the TP, namely, a frequency band F1, and then instruct the TP to perform intra-frequency measurement. In this way, the TP only needs to measure the uplink reference signal at the working frequency band of the TP. It should be understood that the foregoing two measurement manners may be used separately, or may be used in a combined way, and no specific limitation is imposed thereon in this embodiment of the present invention.

When receiving a measurement report reported by each TP, the RAN controller may determine, based on the measurement report reported by the TP, whether to update a TP set used for transmitting data of the UE. Specifically, the RAN controller may compare, one by one, the measurement results reported by all the TPs with measurement results reported by a TP set used for currently transmitting data of the UE, may compare differences or absolute differences between the measurement results reported by all the TPs and measurement results reported by TPs in a TP set used for currently transmitting data of the UE, with a threshold one by one, may compare, one by one, the measurement results reported by all the TPs with an average value of measurement results reported by a TP set used for currently transmitting data of the UE, so as to determine, based on a comparison result, whether to update the TP set used for transmitting the data of the UE.

For example, it is assumed that the measurement parameter is the reference signal received quality; the TP set used for currently transmitting the data of the UE includes a TP1 and a TP2; the RAN controller allocates a measurement task to the TP1, the TP2, a TP3, and a TP4 separately, to be specific, when the reference signal received quality is higher than a threshold, the TP1, the TP2, the TP3, the TP4 send measurement reports to the RAN controller. After receiving reference signal received quality reported by the TP1, the TP2, and the TP3 separately, the RAN controller may determine, based on the following manner, whether to update the TP set used for transmitting the data of the UE:

Manner 1: The TP3 is directly added to the TP set used for transmitting the data of the UE, that is, the TP set used for transmitting the data of the UE is updated to the TP1, the TP2, and the TP3.

Manner 2: Reference signal received quality reported by the TP3 is separately compared with results reported by the TP1 and the TP2, and if a result from the TP3 is higher than that from at least one of the TP1 and the TP2, or if a difference or an absolute difference between reference signal received quality reported by the TP3 and reference signal received quality reported by the TP1 is higher than a threshold, or if a difference or an absolute difference between reference signal received quality reported by the TP3 and reference signal received quality reported by the TP2 is higher than a threshold, the RAN controller may add the TP3 to the TP set used for transmitting the data of the UE, or the RAN controller may replace the TP1 or the TP2 with the TP3.

It should be noted that if the TP1 and the TP2 belong to a RAN controller 1, and the TP3 and the TP4 belong to a RAN controller 2, a measurement report reported by the TP3 may be forwarded by the RAN controller 2. To avoid a case in which there is a large time difference between receiving, by the RAN controller 1, measurement reports from the TP1 and the TP2 and receiving a measurement report from the TP3 forwarded by the RAN controller 2, time information may be introduced in a measurement report, to indicate time for recording a measurement result. It should be understood that the RAN controller 2 may forward all received measurement reports, or may select, according to a specified policy, for example, after measurement result comparison, only some measurement reports for forwarding.

When determining to update the TP set used for transmitting the data of the UE, the RAN controller may notify the UE of this case by using at least one of the following signaling or information: radio resource control RRC signaling, L1 signaling, L2 signaling, and downlink control information (DCI).

It should be noted that no specific limitation is imposed on a name, a type, and a form of a signal that is sent by the UE and that is to be measured by a network in this embodiment of the present invention. That UE sends an uplink reference signal is used as an example in the following, but no limitation is imposed thereon in this embodiment of the present invention. For example, a newly introduced tracking signal used for tracking a UE location, or a sounding reference signal (SRS) may be used.

Based on the hyper cell, two states: a power saving state and an activated state are introduced for the UE in the hyper cell. It should be understood that the power saving state and the activated state described herein are for distinguishing between an idle state and a connected state in the prior art. However, this embodiment of the present invention does not exclude a case in which names of the idle state and the connected state are still used after introduction of the hyper cell. In this case, the activated state in this embodiment of the present invention may be corresponding to the connected state, and the power saving state in this embodiment of the present invention may be corresponding to the idle state, or may be corresponding to the connected state. It can be further understood that, as a new UE status, the power saving state may be independent of the hyper cell, that is, the power saving state may also be applicable to the prior art, but differ from the idle state and the connected state in the prior art. The following details functions and characteristics of the UE in the two states.

The UE in the power saving state continues to reserve the DUI of the UE, and may have some or all of the following functions:

1. The UE may handle some background services and perform small packet transmission.

2. The UE may support downlink scheduling-free (DL Scheduling-free) transmission, that is, may use a downlink shared resource.

3. The UE may support uplink grant-free (UL grant-free) transmission, that is, may use an uplink shared resource.

4. The UE may not monitor a dynamic control channel.

5. The UE may perform a small amount of connection management (for example, long-period link self-adaption and long-period measurement).

6. The UE may reserve an RRC connection to a network side.

7. The UE may reserve a signaling-plane bearer and a user-plane bearer with a core network; or may reserve only a signaling-plane bearer with a core network, and delete a user-plane bearer from the core network. When an uplink background service or small-packet data needs to be transmitted, sending may be performed by using the signaling-plane bearer with the core network. For example, access stratum signaling may carry a data packet, or non-access stratum (NAS) signaling may carry a data packet. After the data packet is transmitted to a mobility management entity (MME), the MME identifies the data packet as a background service or small-packet data, and forwards the data packet to a serving gateway (SGW). Optionally, in an implementation, the UE in the power saving state may reserve a signaling-plane bearer with the core network, delete a dedicated user-plane bearer from the core network, and establish a common or default user-plane bearer with the core network.

When an uplink background service or small-packet data needs to be transmitted, the uplink background service or the small-packet data may be transmitted by using the common or default user-plane bearer with the core network.

8. The UE may send an uplink reference signal periodically, or may send an uplink reference signal after an event triggered condition is met. The event triggered condition may be performing triggering based on a UE speed. For example, a current sending period configured by the network side is T, and a threshold of the UE speed is V. When the UE speed is less than and/or equal to V, the UE may automatically prolong an uplink reference signal sending interval to N*T, where N=2, 3, . . . ; further, if the UE is still, an uplink reference signal sending period may be configured to being infinitely great. During specific implementation, a maximum reference signal sending period, for example, 256 s or 30 min, may be configured. Alternatively, the event triggered condition may be performing triggering after the UE detects another hyper cell. For example, when the UE moves to an overlapping coverage area of a plurality of hyper cells, in addition to an ID of a hyper cell in which the UE is currently located, the UE may further detect an ID of another hyper cell; in this case, the UE may send an uplink reference signal.

The UE in the activated state has a DUI, and may have some or all of the following functions:

1. The UE may handle an interaction service and a session service.

2. The UE may use an uplink/downlink shared resource and a dedicated resource.

3. The UE may support fast-connection management (for example, fast link self-adaption and short-period measurement).

As described above, the UE has the two states, and can change between the two states. For example, when service data transmission is no longer performed within a period of time that elapses after data of the UE is transferred, the UE may change from the activated state to the power saving state; the UE in the power saving state may not monitor a dynamic control channel, and only needs to support a small amount of connection management; in this way, the UE in the power saving state consumes less power than that in the activated state.

Optionally, in an embodiment, the UE may measure a parameter or an index to determine whether to change between the power saving state and the activated state. For example, when it is learned through measurement that a parameter or an index meets a threshold, the UE sends instruction information to the network side, and then the network side may control, according to the indication information, the UE to make a status change. Specifically, the RAN controller may deliver a threshold to the UE in advance, where the threshold may be, for example, a size threshold of buffered data of the UE. When the buffered data of the UE exceeds the threshold, the UE reports a measurement report to the RAN controller, and then the RAN controller controls the UE to make a status change. Alternatively, the RAN controller may send a measurement indication to the UE. As indicated by the measurement indication, when the UE learns, through measurement, that a size of buffered data of the UE exceeds a size of data that allows to be sent currently, the UE reports a measurement report to the RAN controller, and then the RAN controller controls the UE to make a status change. Instruction information from the UE may be reported by using L2 signaling, may be reported by using RRC signaling, for example, a measurement report, or may be reported by using initially sent data, for example, indicated by using an indicator bit in an initially sent data block, for example, the indicator bit is set to TRUE for indication. No specific limitation is imposed thereon in this embodiment of the present invention.

Optionally, in an embodiment, the network side may use RRC signaling to instruct the UE to enter an activated state or a power saving state. For example, a new status indication cell may be added to RRC signaling, where the status indication cell may instruct the UE to enter the power saving state or the activated state, and the UE may enter a corresponding state as indicated by the status indication cell.

Still referring to FIG. 1, when UE is at a location 1, a TP set (or may be referred to as a TP cluster) including TPs in an area 1 may transmit data of the UE (or provide a communications service for the UE). When the user equipment moves from the location 1 to a location 2, a TP set including TPs in an area 2 may provide a communications service for the UE. In other words, in a movement process of the UE, a TP that transmits data of the UE may be updated continuously, and the update task may be completed by a network side based on an uplink reference signal sent by the UE. It should be noted that the TP set used for the UE may be divided into an UL TP set and a DL TP set depending on whether a service is an uplink service of the UE or a downlink service of the UE. Update on the UL TP set may be completed by the network side based on the uplink reference signal sent by the UE. Update on the DL TP set may be completed by the network side based on a downlink reference signal sent by the UE. Optionally, in an embodiment, update may be performed by the network side based on a measurement result reported by the UE based on a downlink reference signal.

Figure 2:
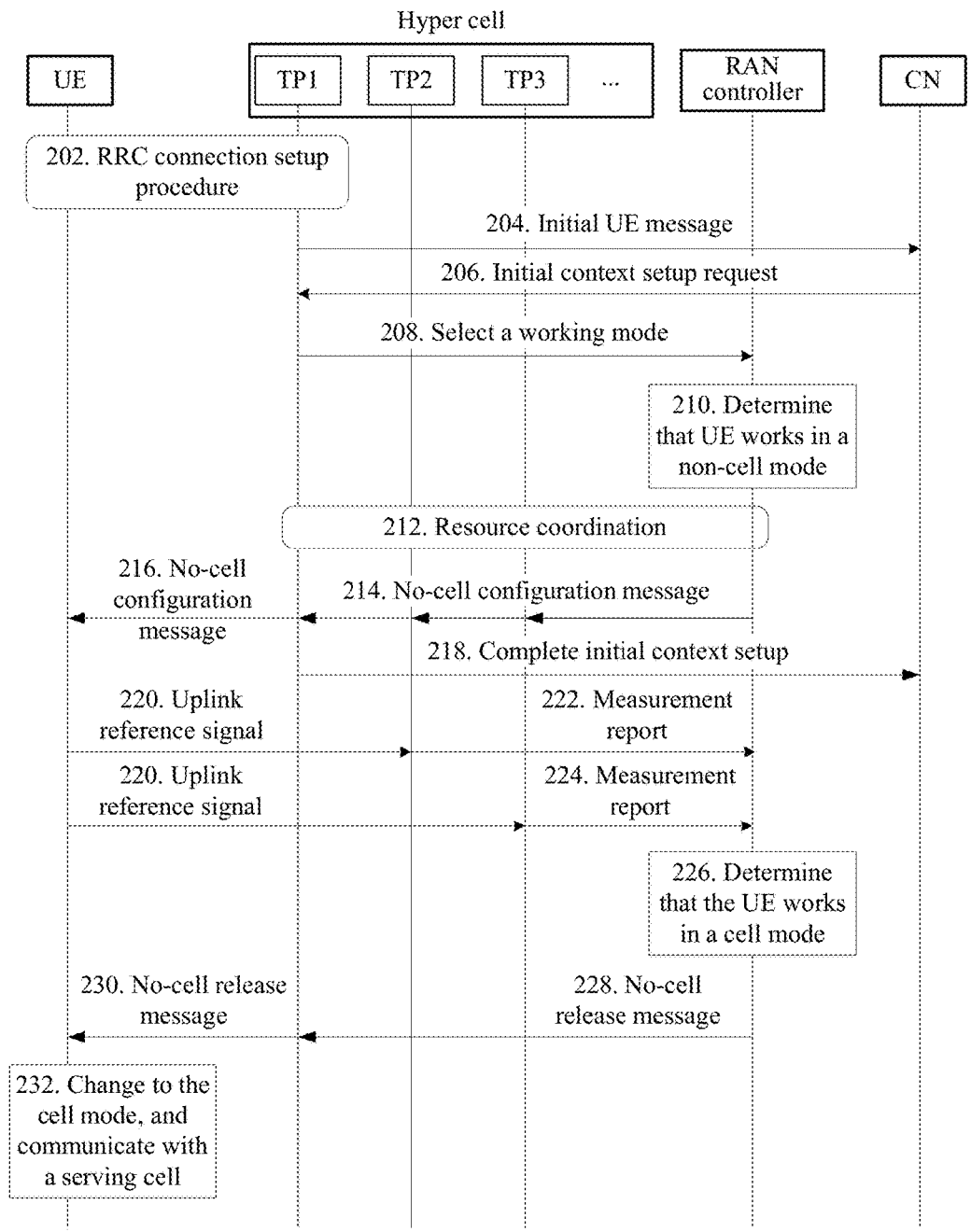
FIG. 2 is a schematic flowchart of a communication method applied to a hyper cell according to an embodiment of the present invention.

FIG. 2 is a schematic flowchart of a communication method applied to a hyper cell according to an embodiment of the present invention. It should be understood that FIG. 2 shows detailed communication steps or operations applied to the hyper cell. However, these steps or operations are merely an example. In this embodiment of the present invention, other operations or variations of operations in FIG. 2 may be further performed. In addition, steps in FIG. 2 may be performed in a sequence different from that presented in FIG. 2, and possibly not all operations in FIG. 2 need to be performed.

In the embodiment in FIG. 2, two working modes: a cell mode (which may also be referred to as a normal-cell mode or a network-centric mode) and a no-cell mode (a no-cell mode or a UE-centric mode) are introduced for UE first. In the cell mode, a prior-art mobility management manner may be used, to be specific, a network sends a downlink reference signal, the UE measures the downlink reference signal and feeds back a measurement report, and the network side performs a cell handover based on the measurement report. In the no-cell mode, the UE may send an uplink reference signal, and the network measures the uplink reference signal from the UE, and continuously updates, based on a measurement result, a TP set used for transmitting data of the UE. However, it should be understood that introducing the two working modes is mainly due to consideration of flexibility and compatibility. A possibility that the no-cell mode completely replaces the cell mode, or that mobility management is performed in the hyper cell only in the cell mode is not excluded in this embodiment of the present invention. In this case, a working mode may not need to be selected for the UE, and the no-cell mode is directly used to provide a service for the UE.

In addition, in the embodiment in FIG. 2, a radio access network controller (RAN controller) provides mobility management for the UE. The RAN controller may be an independent network element on an access network side, but this is not limited in this embodiment of the present invention. For example, the RAN controller and a TP set may be integrated into a same entity, for example, an access network device, and TPs may be transmission and receiving units of the access network device. Alternatively, the RAN controller may be a TP, and the TP may be or may not be a TP in a TP set that provides a data transmission service for the UE. When the TP is a TP in a TP set that provides a data transmission service for the UE, the RAN controller may directly send signaling to the UE.

The following describes specific steps in FIG. 2.

202. The UE initiates initial access, and performs a radio resource control (RRC) connection setup procedure.

In the RRC connection setup process, a related parameter may be carried in a network. The parameter may include at least one of a UE speed, a UE location, a signal situation of a detected neighboring cell, service information, and the like. The parameter may be a parameter obtained through measurement by using a Global Positioning System (GPS) of the UE or in another manner.

204. The hyper cell sends an initial UE message to a core network (CN).

206. The CN sends an initial context setup request to the hyper cell.

In steps 204 and 206, the hyper cell sets up a connection to the CN for the UE. In the foregoing process, the hyper cell may obtain information such as a type of the UE or a capability of the UE from the UE or the CN. Specifically, the type of the UE may mean whether the UE is UE at a fixed location, for example, a sensor, whether the UE is sensitive to power consumption, or the like. The capability of the UE may mean, for example, whether the UE supports the no-cell mode, that the UE supports which frequency band or which frequency bands, or the like.

208. The hyper cell sends a message to the RAN controller, to request the RAN controller to determine a working mode of the UE.

In step 208, the message sent by the hyper cell to the RAN controller may carry information of the UE that is obtained by using steps 202 to 206, for example, a system architecture evolution temporary mobile subscriber identity (S-TMSI) of the UE, a movement speed of the UE, a location of the UE, the type of the UE, the capability of the UE, or service information of the UE.

210. The RAN controller determines the working mode of the UE.

The RAN controller may determine the working mode of the UE based on the message provided by the hyper cell in step 208. For example, the RAN controller learns of an approximate location, the movement speed, or the like of the UE based on the received information, and determines, based on a deployment status of a network surrounding the location, whether it is suitable to use the no-cell mode. If it is suitable to use the no-cell working mode and the UE supports the no-cell mode, the working mode of the UE may be determined as the no-cell mode.

212. The RAN controller performs resource coordination with TPs in the hyper cell.

In step 212, the RAN controller may allocate a first TP set and a second TP set for the UE based on the obtained information of the UE (for example, the location of the UE, the speed of the UE, and the type of the UE), and perform resource coordination with these TPs. Each TP set includes one or more TPs. A TP in the second TP set may be configured to perform data transmission for the UE. Therefore, the second TP set may also be referred to as a transmission TP set or a transmission cluster for the UE. A TP in the first TP set may be configured to measure an uplink reference signal sent by the UE; therefore, the first TP set may also be referred to as a measurement TP set or a measurement cluster for the UE.

Figure 3:
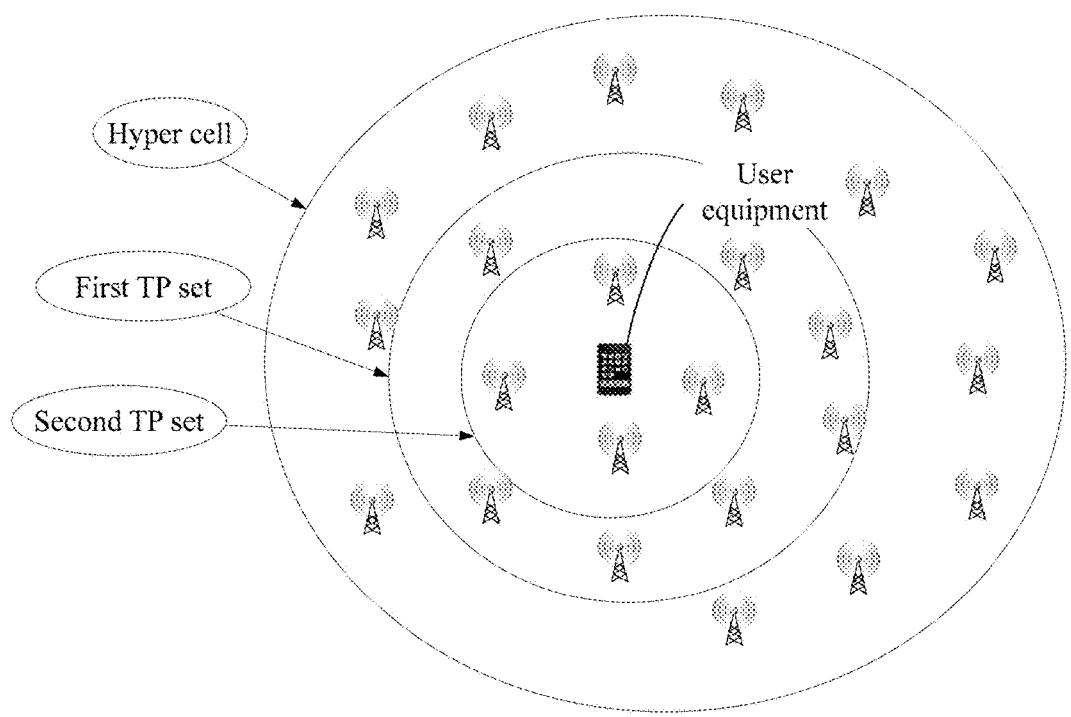
FIG. 3 is a diagram of an example of a TP set used for UE according to an embodiment of the present invention.

Specifically, the TPs in the first TP set and the second TP set may be TPs surrounding the UE. Generally, the second TP set may be a subset of the first TP set. As shown in FIG. 3, at a current location of the UE, the first TP set includes the second TP set. Optionally, in an embodiment, the first TP set may include the second TP set and a TP layer surrounding the second TP set. It should be noted that a TP set including all TPs in the hyper cell may also be set as the first TP set used for the UE. In this case, all the TPs in the hyper cell need to measure the uplink reference signal sent by the UE. This setting manner may cause relatively heavy network load. Therefore, in an embodiment, at least one TP may be selected from the hyper cell to form the second TP set and the first TP set that are used for the UE. Then, the second TP set and the first TP set that are used for the UE may be dynamically updated based on a UE location change.

214. The RAN controller sends no-cell configuration (no-cell configuration) messages to TPs in a second TP set and a first TP set.

The no-cell configuration message may be used to instruct the TP in the second TP set to provide a service for the UE and instruct the TP in the first TP set to measure the uplink reference signal sent by the UE. The no-cell configuration message may include an S-TMSI of the UE. Optionally, in an embodiment, the no-cell configuration message may further include a DUI allocated by the RAN controller for the UE, where the DUI may be used to identify the UE (or uniquely identify the UE) in the hyper cell.

Optionally, in an embodiment, there may be a correspondence between a DUI of the UE and a time-frequency resource (or referred to as a time-frequency sequence) used by the UE to send the uplink reference signal. The TP in the first TP set may determine, based on the DUI of the UE and the correspondence, the time-frequency resource used by the UE to send the uplink reference signal, so as to measure, on the time-frequency resource, the uplink reference signal sent by the UE. Certainly, no limitation is imposed thereon in this embodiment of the present invention. For example, the no-cell configuration information may be used to indicate, to the TP in the first TP set, a location of the time-frequency resource occupied by the uplink reference signal from the UE.

Optionally, in an embodiment, if an update occurs in a TP in the second TP set used for the UE, for example, a TP4 replaces an original TP3, a subsequent processing manner for some data (for example, some data not sent successfully or sent data for which no ACK is received), related to the UE, in the TP4 may be considered. Specifically, if the TP4 and the TP3 belong to a same hyper cell, data not sent by the UE and data for which no ACK is received and that is sent by the UE need to be exchanged between the RAN controller and the TP3; the RAN controller sends the data to the TP4 based on a feedback from the TP3, and the TP4 sends the data to the UE; and the UE sends a corresponding feedback according to a HARQ feedback mechanism configured by the RAN controller. If the TP4 and the TP3 belong to different hyper cells, processing by a Media Access Control (MAC) entity of the UE may still need to be considered. For example, a MAC entity 1 processes data received by a hyper cell 1, and when the TP4 (belongs to a hyper cell 2) is configured to provide a data service for the UE, a mapping relationship between the MAC entity 1 and two hyper cells (the hyper cell 1 and a hyper cell 2) may be carried, to instruct a MAC entity 1 to process data from the TP4; the UE may identify a hyper cell to which a TP belongs, and when TPs replaced as indicated by a configuration indication received by the UE from a network side belong to different hyper cells, the UE may clear buffered data received from the TP3. Certainly, in a network architecture with an ideal latency, a TP may include only a physical layer PHY, a MAC layer and an upper layer thereof are located on a BBU-pool side; therefore, the foregoing data forwarding process is triggered only when a BBU-pool changes. In a network architecture with a non-ideal latency, only a Packet Data Convergence Protocol (PDCP) layer is located on a baseband unit (BBU)-pool side, and all other protocol layers are located on a TP side (or all protocol layers are located on a TP side); in this case, there is an RRC reconfiguration process during each TP change.

Optionally, in an embodiment, to reduce an interrupt latency of user-plane data transmission in a change process, data to be sent to UE may be pre-stored in each TP. When a TP set used for transmitting data of the UE changes, the UE completes a related reconfiguration process based on a network configuration, for example, a reconfiguration process of at least one protocol layer of an RRC layer, a PDCP layer, a radio link control (RLC) layer, a MAC layer, and a PHY layer, and sends an instruction message of currently buffered data to a network. The instruction message may be sent by using at least one of the following messages or signaling: a service request message, reconfiguration complete signaling, and L2 signaling, or may be sent by using an uplink physical control channel and a data channel. The instruction message may carry a current data buffer status, for example, an identifier of a protocol layer (the protocol layer may be at least one of the protocol layers such as the RRC layer, the PDCP layer, the RLC layer, the MAC layer, and the PHY layer) and HARQ information corresponding to data in the protocol layer, so that a new TP can uniquely identify the data based on the instruction message, and perform data transmission for the UE based on the corresponding HARQ information (including ACK or NACK information for the data). Using an example in which the UE updates only a number of a data receiving port or the UE only reconfigures a PHY protocol layer, the UE can send an instruction message to the network side, and add identification information of one or more of the PDCP layer, the RLC layer, and the MAC layer to the instruction message. The instruction message may further carry HARQ information, corresponding to the identification information, of data in a protocol layer. A new TP receives the instruction message and re-transmits the NACK information. Optionally, the new TP sends acknowledgment information to an original TP, to instruct the original TP to stop sending data to the UE.

216. The RAN controller sends a no-cell configuration message to the UE by using a TP.

The no-cell configuration message may be used to instruct the UE to work in the hyper cell in the no-cell mode. Optionally, in an embodiment, the no-cell configuration message may include a DUI of the UE. The UE may perform data transmission with the TP in the second TP set by using the DUI. Optionally, the no-cell configuration message includes information about the TP in the first TP set.

218. The hyper cell sends an initial context setup complete message to the CN.

Next, the UE can work in the no-cell mode, perform data communication with the second TP set allocated by the RAN controller for the UE, and send the uplink reference signal for measurement by the first TP set.

220. The UE sends an uplink reference signal.

The location of the time-frequency resource for the uplink reference signal from the UE may be indicated by the no-cell configuration message in step 216. Optionally, in an embodiment, a correspondence between a dedicated user identity of the UE and the time-frequency resource for the uplink reference signal may be pre-established. The UE may determine, based on the correspondence, the time-frequency resource for sending the uplink reference signal.

In an embodiment, the uplink reference signal may be an SRS. In an embodiment, the uplink reference signal may be periodically sent, or may be sent after the UE moves a distance, where the distance may be configured by the network, or may be sent by combining the foregoing two sending manners, that is, the uplink reference signal is sent after it is detected that the UE moves a specified distance, and is also sent after a period expires.

222 and 224. The TP in the first TP set measures the uplink reference signal sent by the UE, and reports a measurement report to the RAN controller.

Based on a measurement report reported by the TP in the first TP set or the second TP set, the RAN controller may continuously adjust or update the second TP set (or continuously adjust or update a member of the second TP set, for example, add another TP to the second TP set, or delete a member from the second TP set). In an embodiment, the RAN controller may alternatively continuously adjust or update the first TP set (or continuously adjust or update a member of the first TP set, for example, add another TP to the first TP set, or delete a member from the first TP set).

Specifically, when the uplink reference signal from the UE measured by a TP in the second TP set is weakened, for example, strength of the measured uplink reference signal is lower than a threshold, the TP may be deleted from the second TP set; when a TP in the first TP set does not detect an uplink reference signal (or strength of the detected uplink reference signal is lower than a specified threshold) and meets a specified condition (for example, a TP layer surrounding the UE also does not detect an uplink reference signal from the UE or the detected uplink reference signal is lower than a specified threshold), the TP may be deleted from the first TP set; when a TP in the first TP set measures the uplink reference signal from the UE (or the measured uplink reference signal from the UE is higher than a threshold), a TP layer surrounding the UE may be added to the first TP set; when a TP in the first TP set measures the uplink reference signal from the UE and signal strength is high enough (that is, when the measured uplink reference signal from the UE is higher than a configured or specified threshold, or when the measured uplink reference signal from the UE is compared, one by one, with differences or absolute differences between measurement results reported by TPs in the second TP set or with an average measurement result of measurement results reported by TPs in the second TP set, where the differences or absolute differences are less than a threshold), the TPs may be added to the second TP set. Optionally, the RAN controller may notify, by using at least one of the following information or signaling: RRC signaling, L1 signaling, L2 signaling, and DCI, the UE of the TP added to the second TP set.

226. The RAN controller determines that the UE works in a cell mode.

The RAN controller may determine, based on the measurement report reported by the first TP set, that it is no longer suitable for the UE to work in the no-cell mode, for example, the UE is to move out of a coverage area of the hyper cell, and a cell that the UE is to enter is a normal cell; in this case, the RAN controller may change the working mode of the UE to the cell working mode.

228 and 230. The RAN controller sends a no-cell release message to the UE by using a TP.

The no-cell release message may be used to instruct the UE to enter the cell mode. The no-cell release message may carry a frequency and/or a cell ID of a serving cell, and is used to indicate a serving cell for the UE in the cell mode. In an embodiment, the frequency and/or the cell ID may be of a cell corresponding to a TP in a current second TP set. In an embodiment, the no-cell release message may indicate frequencies and cell IDs of a plurality of serving cells. For example, a cell in the plurality of serving cells may be a primary cell, and other cells are secondary cells; in this case, the UE may perform carrier aggregation in the cell mode.

232. The UE changes to the cell mode, and communicates with a serving cell.

In this embodiment of the present invention, the network can flexibly configure the working mode of the UE, and control the UE to flexibly change between the no-cell mode and the cell mode. This improves network performance.

In the embodiment in FIG. 2, the UE may be UE in an activated state. The following details, with reference to FIG. 4, a manner of paging UE in a power saving state (or UE in an ECO state, where ECO represents ecology (ecology), conservation (conservation), and optimization (optimization); or UE in an idle state) that is in a hyper cell and entering, by the UE in an activated state (or referred to as a connected state).

In an existing design idea that UE follows a network, UE in a power saving state still measures an uplink reference signal of each cell, and reselects a cell based on a measurement result to try to choose to camp on a cell having a good signal status. When the UE needs to transmit data, the UE initiates an RRC connection in a currently camped cell, to enter an activated state. In the embodiment in FIG. 4, the UE in the power saving state that is in a no-cell mode chooses to camp in a unit of a hyper cell, and an uplink resource is preconfigured for the UE. When needing to transmit data, the UE may use the preconfigured uplink resource to quickly enter an activated state, with no need to initiate a new complex and time-consuming RRC connection. The following provides detailed descriptions with reference a specific procedure.

Figure 4:
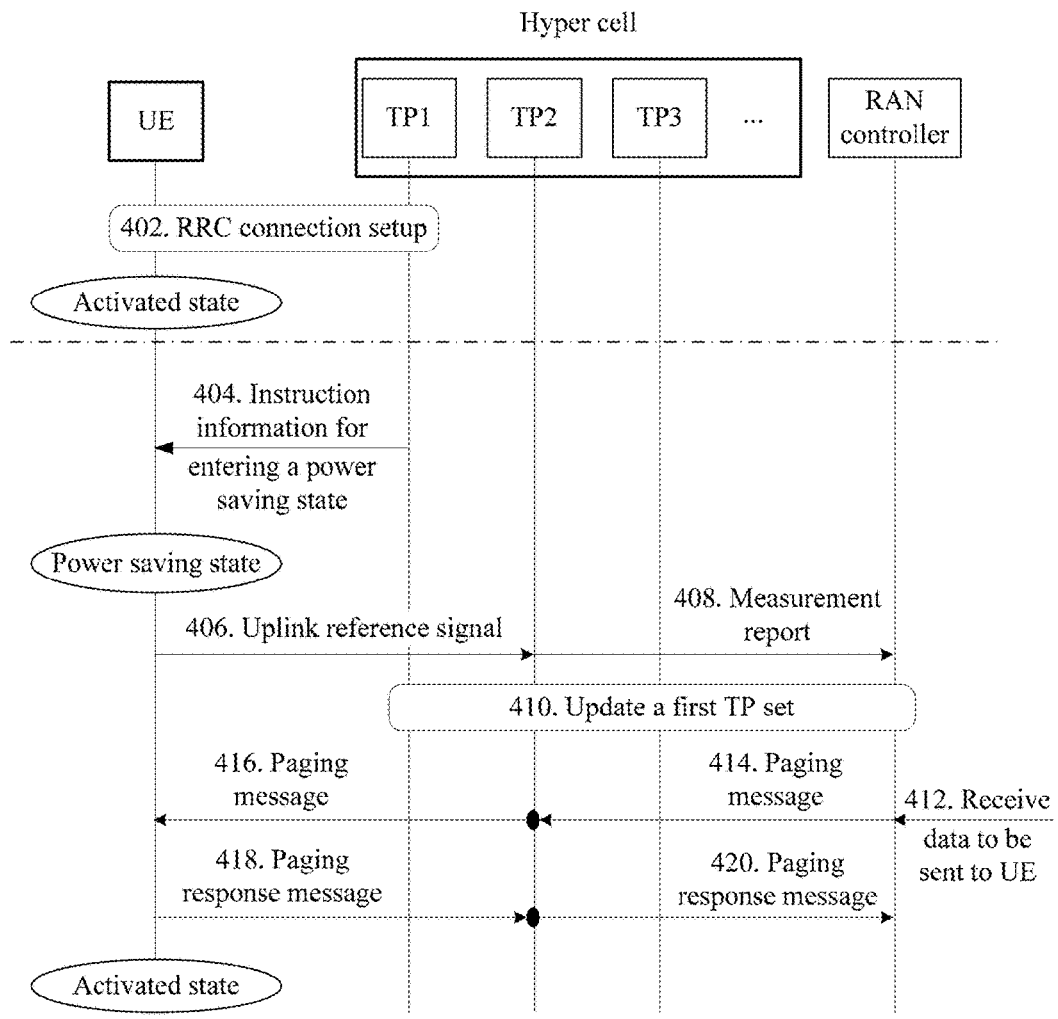
FIG. 4 is a schematic flowchart of a communication method applied to a hyper cell according to an embodiment of the present invention.

FIG. 4 is a schematic flowchart of a communication method applied to a hyper cell according to an embodiment of the present invention. It should be understood that FIG. 4 shows detailed communication steps or operations applied to the hyper cell. However, these steps or operations are merely an example. In this embodiment of the present invention, other operations or variations of operations in FIG. 4 may be further performed. In addition, steps in FIG. 4 may be performed in a sequence different from that presented in FIG. 4, and possibly not all operations in FIG. 4 need to be performed.

Some or all steps in FIG. 2 may be performed before step 404. For example, step 402 is similar to step 202. To avoid repetition, details are not described herein again.

404. The UE receives instruction information for entering a power saving state that is sent by a network side.

For example, when the UE does not have frequent services or almost has no service, a network may instruct the UE to enter the power saving state (or an ECO state). Optionally, the instruction information may carry a configuration parameter of the power saving state. Specifically, the configuration parameter may include at least one of the following parameters:

Parameter 1: a parameter indicating that a working mode of the UE in the power saving state is a no-cell mode.

It should be understood that the parameter is optional, for example, the parameter does not need to be configured, provided that the working mode of the UE in the power saving state keep the same as a working mode of the UE in an activated state. In addition, if a working mode of the UE in an idle state is a cell working mode, with reference to an existing manner, the UE may be paged and enter an activated state, and details are not described herein.

Parameter 2: a parameter indicating a paging occasion of the UE.

The paging occasion may refer to a parameter such as a time-frequency resource used by the UE to receive a paging message or send a paging response message. In an embodiment, a parameter related to the paging occasion may be associated with a dedicated user equipment identity of the UE in a hyper cell, that is, the UE may determine the paging occasion based on a dedicated user equipment identity.

Parameter 3: a parameter used by the UE for quick recovery (or quickly entering an activated state).

The parameter may indicate an uplink resource preconfigured for the UE, for example, a scheduling resource (SR), a physical uplink shared channel (PUSCH), or an uplink contention resource. In an embodiment, a parameter used by the UE to quickly enter the activated state may also be associated with the dedicated user equipment identity of the UE. The UE may determine, based on the dedicated user equipment identity of the UE and the association relationship, a scheduling resource allocated for the UE, and quickly enter the activated state by using the scheduling resource, with no need to perform a complex RRC connection setup process.

Parameter 4: a timing advance (TA) related configuration parameter.

For example, an initial TA value is provided for the UE, and after entering the activated state, the UE may send uplink data by using the initial TA value.

406. The UE that has entered the power saving state sends an uplink reference signal.

Specifically, the UE in the power saving state may continue to reserve the dedicated user equipment identity, continue to send the uplink reference signal, and listen to a paging message. TP frequency bands in a same hyper cell or in different hyper cells may differ. Therefore, based on a principle that a network is transparent to UE as much as possible, two anchor frequency bands may be introduced in some implementations:

Anchor frequency band 1: is used by the UE to receive paging, perform downlink synchronization, and/or the like; and herein, for ease of description, is referred to as a paging (paging) frequency band (or referred to as a downlink synchronization band).

Anchor frequency band 2: is used by the UE to send an uplink reference signal, where a same frequency band can be monitored by TPs in different frequency bands; and herein, for ease of description, is referred to as a reference signal frequency band.

The two frequency bands may "remain unchanged". For example, the two frequency bands may be used throughout the entire network, regardless of wherever the UE in the network moves. Alternatively, the two frequency bands may be fixed in a specified range. For example, in a no-cell mode, the network sends configuration information of anchor frequency bands to the UE. An advantage brought by introduction of the anchor frequency bands is that, the UE does not need to care about a frequency band of a surrounding network even when the UE moves, and the UE only needs to do two things: One is to listen to whether the UE has its own paging in a "fixed" paging frequency band, or optionally, to perform downlink synchronization based on a paging frequency band, so as to send the paging in a reference signal frequency band; the other is to send an uplink reference signal in a "fixed" reference signal frequency band. It should be noted that the mechanism of the anchor frequency bands is also applicable to communication between the UE in the activated state and the network. A manner of sending the uplink reference signal by the UE in the power saving state may be: periodically sending the uplink reference signal, or sending the uplink reference signal after it is detected that the UE moves a specified distance, so as to save power; or a combination thereof, that is, sending the uplink reference signal after it is detected that the UE moves a specified distance, and sending the uplink reference signal after a period expires.

408 and 410. A TP in a first TP set sends, to a RAN controller, a measurement report for the uplink reference signal from the UE, and the RAN controller continuously adjusts or updates the TP in the first TP set based on the measurement report.

For example, when a TP in the first TP set does not detect an uplink reference signal sent by the UE and meets a specified condition, for example, a TP layer surrounding the TP also does not detect an uplink reference signal, the TP may be deleted from the first TP set. For another example, when a TP in the first TP set detects the uplink reference signal sent by the UE, a TP layer surrounding the TP may alternatively be added to the first TP set.

412. The RAN controller receives data to be sent to the UE.

414 and 416. The RAN controller sends a paging message to the UE by using a TP.

Specifically, the RAN controller may select one or more TPs with better signal quality from the first TP set, and send a paging message to the UE in a paging frequency band by using the TP or TPs. The paging message may carry an identity of the UE. Optionally, in an embodiment, an uplink resource used by the UE to quickly enter the activated state may be carried in the paging message. Optionally, in an embodiment, when a relatively small amount of downlink data is sent, the downlink data may be directly sent to the UE by using a paging message, and the UE does not need to enter the activated state. This can prevent the UE from frequently changing between the activated state and the power saving state.

418 and 420. The UE sends a paging response message to the RAN controller on a preconfigured uplink resource by using a TP.

As described above, the preconfigured uplink resource may be indicated by the instruction information in step 404, may be associated with the dedicated user equipment identity of the UE, or may be indicated by the paging message in steps 414 and 416. This is not specifically limited in this embodiment of the present invention. The UE sends the paging response message by using the pre-allocated uplink resource, with no need to initiate an RRC connection setup process to quickly enter the activated state.

The descriptions in FIG. 2 to FIG. 4 all include update, management, and maintenance by the RAN controller on a TP set related to the UE. The following describes related content in more detail with reference to a specific embodiment.

Figure 5:
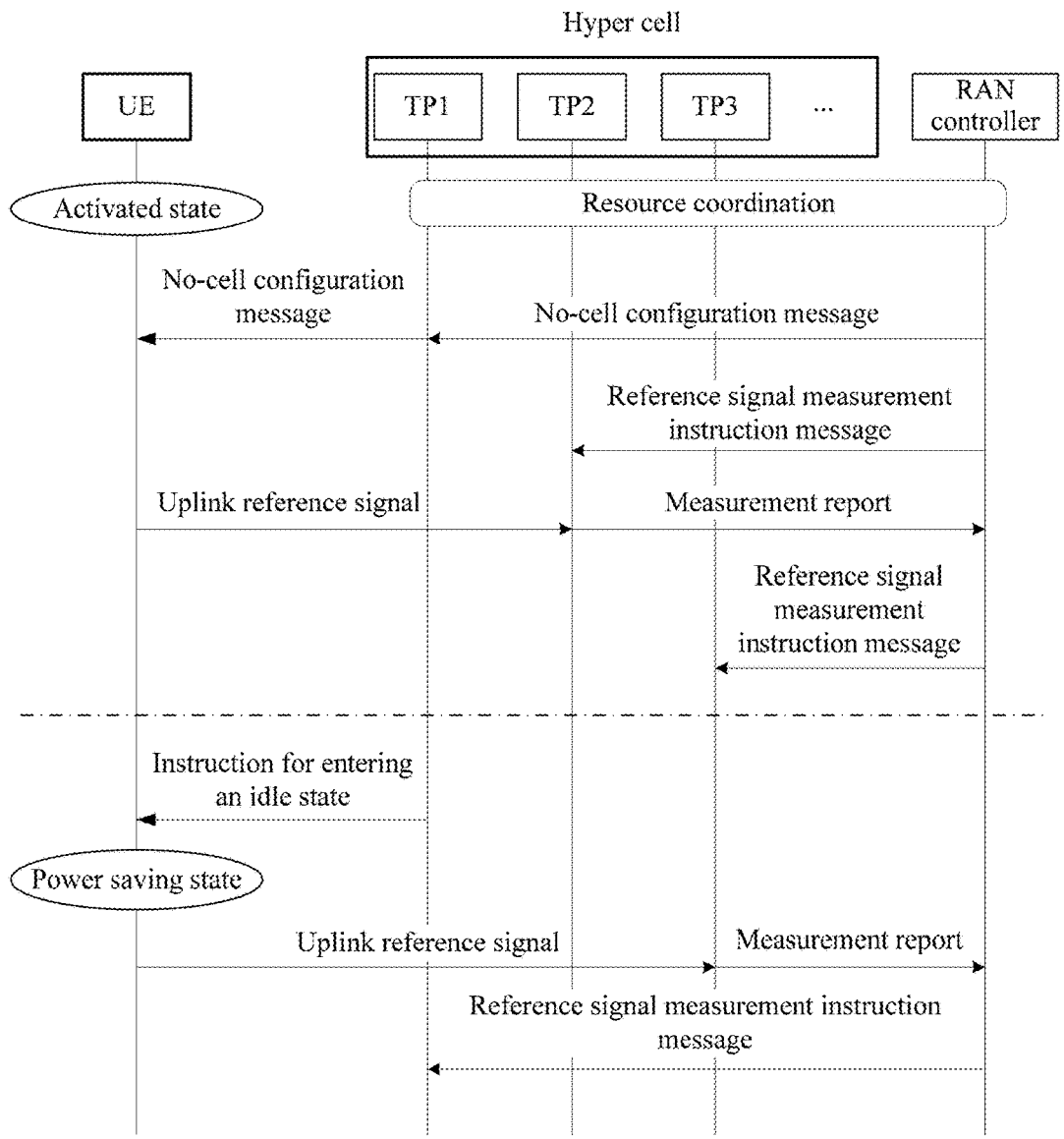
FIG. 5 is a schematic flowchart of a method applied to a hyper cell according to an embodiment of the present invention.

It should be understood that the TP set related to the UE includes a second TP set (used for transmitting data of the UE, or referred to as a transmission cluster for the UE) for the UE and the first TP set (used for measuring the uplink reference signal sent by the UE, or referred to as a measurement cluster for the UE). The RAN controller may maintain the second TP set and the first TP set for the UE in the activated state. Because the UE in the power saving state does not need to transmit data, the RAN controller may maintain only the first TP set for the UE. Certainly, the first TP set may include at least one TP in the hyper cell. If the first TP set includes all TPs in the hyper cell, the first TP set does not need to be updated, but all the TPs in the hyper cell measure the uplink reference signal from the UE. This increases load on a network side. Therefore, the first TP set may include only some TPs in the hyper cell, and only needs to continuously update the first TP set with the movement of the UE. With reference to FIG. 5, the following details procedures of adding a TP to or deleting a TP from a TP set.

FIG. 5 is a schematic flowchart of a method applied to a hyper cell according to an embodiment of the present invention. It should be understood that FIG. 5 shows detailed communication steps or operations applied to the hyper cell. However, these steps or operations are merely an example. In this embodiment of the present invention, other operations or variations of operations in FIG. 5 may be further performed. In addition, steps in FIG. 5 may be performed in a sequence different from that presented in FIG. 5, and possibly not all operations in FIG. 5 need to be performed.

Referring to FIG. 5, a RAN controller may delete a TP from or add a TP to a second TP set by using a message, for example, a no-cell configuration message. The message may carry a DUI of UE. Optionally, when deleting a TP from or adding a TP to a first TP set, the RAN controller informs, by using a signaling message, the UE of the TP deleted from or added to the first TP set by a network, for example, sends information about the TP that is deleted or added, or sends information about a TP that is further included in the first TP set after deletion or addition is performed. The RAN controller may delete a TP from or add a TP to the first TP set by using a reference signal measurement instruction message. The message may carry a dedicated user equipment identity of the UE. Optionally, in an embodiment, the reference signal measurement instruction message may further carry a configuration message of an uplink reference signal, to indicate a time-frequency resource for the uplink reference signal sent by the UE. Certainly, this is merely an example of a manner of determining an uplink reference signal configuration. A manner of associating the dedicated user equipment identity of the UE with the time-frequency resource for the uplink reference signal may be used to determine the uplink reference signal. This is not specifically limited in this embodiment of the present invention.

Generally, security protection needs to be performed on all data transmitted over an air interface. For example, data transmitted over an air interface may be encrypted. As described above, the RAN controller allocates, for the UE, a second TP set used for transmitting data of the UE. If each TP in the second TP set encrypts the data of the UE, efficiency of an entire system is relatively low. To ensure that the entire system is more simple and effective, a data anchor that provides an encryption service for all data of the UE may be introduced on a network side. The data anchor may be, for example, a serving gateway.

Figure 6:
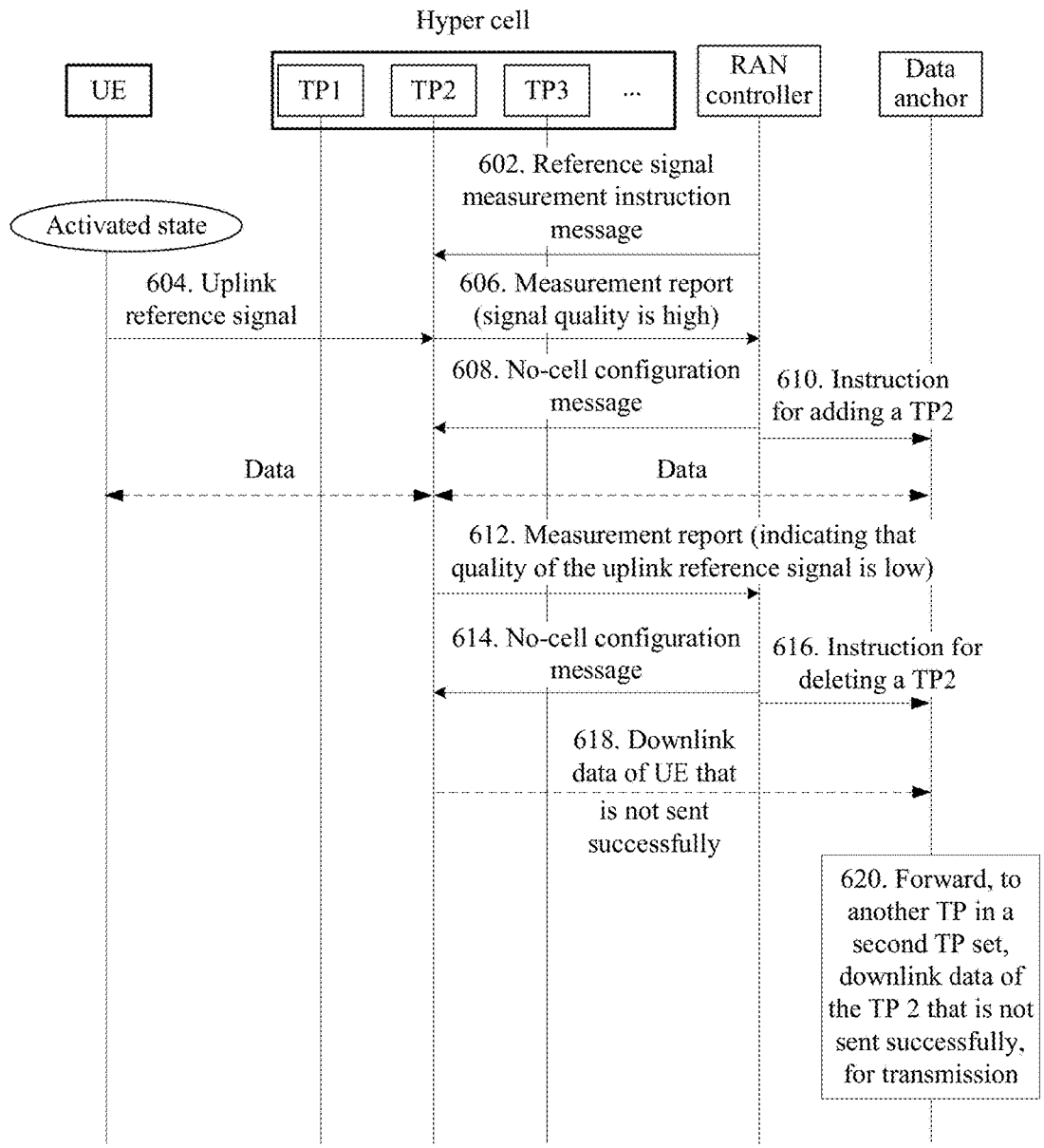
FIG. 6 is a schematic flowchart of a method applied to a hyper cell according to an embodiment of the present invention.

When a TP in the second TP used for the UE is deleted from the second TP set, if the TP still has downlink data of UE that is not sent successfully, an embodiment of the present invention provides a communication procedure shown in FIG. 6, to reduce a loss of UE data.

602. An RAN controller sends a reference signal measurement instruction message to a TP2.

Specifically, the RAN controller instructs, by using the reference signal measurement instruction message, the TP2 to measure an uplink reference signal sent by the UE, indicating that the RAN controller has added the TP2 to a first TP used for the UE.

604 and 606. The TP2 measures an uplink reference signal from the UE, and sends a measurement report to the RAN controller, where the measurement report indicates that quality of the measured uplink reference signal from the UE is high.

608. The RAN controller sends a no-cell configuration message to the TP2, where the no-cell configuration message indicates that the TP2 is added to a second TP used for the UE and can be used for transmitting data of the UE.

610. The RAN controller notifies a data anchor that the TP2 is added to the second TP used for the UE.

Specifically, because the data anchor is responsible for encrypting the data of the UE and transmits the encrypted data to the UE by using a TP in the second TP set, the RAN controller may notify the data anchor that the TP2 has been added to the second TP set, so as to transmit the data of the UE.

612. The TP2 sends a measurement report to the RAN controller, where the measurement report indicates that quality of the measured uplink reference signal from the UE is low.

614. The RAN controller sends a no-cell configuration message to the TP2, where the no-cell configuration message indicates that the TP2 has been deleted from the second TP used for the UE and is no longer responsible for transmitting data of the UE.

616. The RAN controller notifies the data anchor that the TP2 has been deleted from the second TP used for the UE.

In this way, the data anchor does not send the encrypted downlink data of the UE to the TP2.

618. The TP2 sends, to the data anchor, the downlink data of the UE that is not sent successfully.

620. The data anchor forwards, to another TP in the second TP set, downlink data of the TP2 that is not sent successfully, and the other TP sends the downlink data to the UE.

According to this embodiment of the present invention, not only security of UE data is ensured, but also a loss of the UE data is effectively avoided.

In addition, it should be noted that if a radio link control (RLC) layer is on a TP node, when a new TP, in particular, an intra-frequency TP, is added, for example, a previous TP is TPx, and an intra-frequency TPy is newly added, because a sequence number of an RLC layer on the new TPy starts from 0, the UE needs to identify that the TPy is a new TP, so as to distinguish from the TPx, thereby correctly receiving data. Possible manners include the following:

Manner 1: Each data packet sent to the UE carries one piece of TP identification information, a data packet sent by each TP to the UE carries identification information of the TP, and the UE identifies, based on the identification information, whether the TP is a new TP, so as to receive data of the TP starting from the sequence number 0. Optionally, a data packet includes one piece of instruction information, to instruct UE to delete a TP, and the network continues to send a data packet carrying the instruction information, until the network determines that the UE successfully receives the data packet carrying the instruction information. Alternatively, if the UE receives no data packet from a TP within a preset time period (for example, the preset time period is configured by the network), the TP is deleted. Similarly, if the network sends no data packet from a TP within a time period of same duration, during next sending, sending is performed starting from a sequence number 0 of the RLC layer.

Manner 2: Each data packet sent to the UE carries a one-bit TP change identifier, and when the change identifier changes, the UE learns that a new intra-frequency TP serves the UE, to release an old intra-frequency TP, where the new TP starts from the sequence number 0. This method is applicable to data transmission performed between only one intra-frequency TP and the UE.

Manner 3: When a new TP is added, or a new TP replaces another TP, the network notifies the UE of information about the newly added TP, so that the UE can learn that a sequence number of a data packet transmitted and borne on the new TP starts from 0.

The foregoing details the communication process of the UE in the hyper cell with reference to FIG. 1 to FIG. 6. The following details, with reference to FIG. 7 and FIG. 8, a process in which UE is handed over from a hyper cell 1 (a first hyper cell) to a hyper cell 2 (a second hyper cell), to ensure service continuity.

Figure 7:
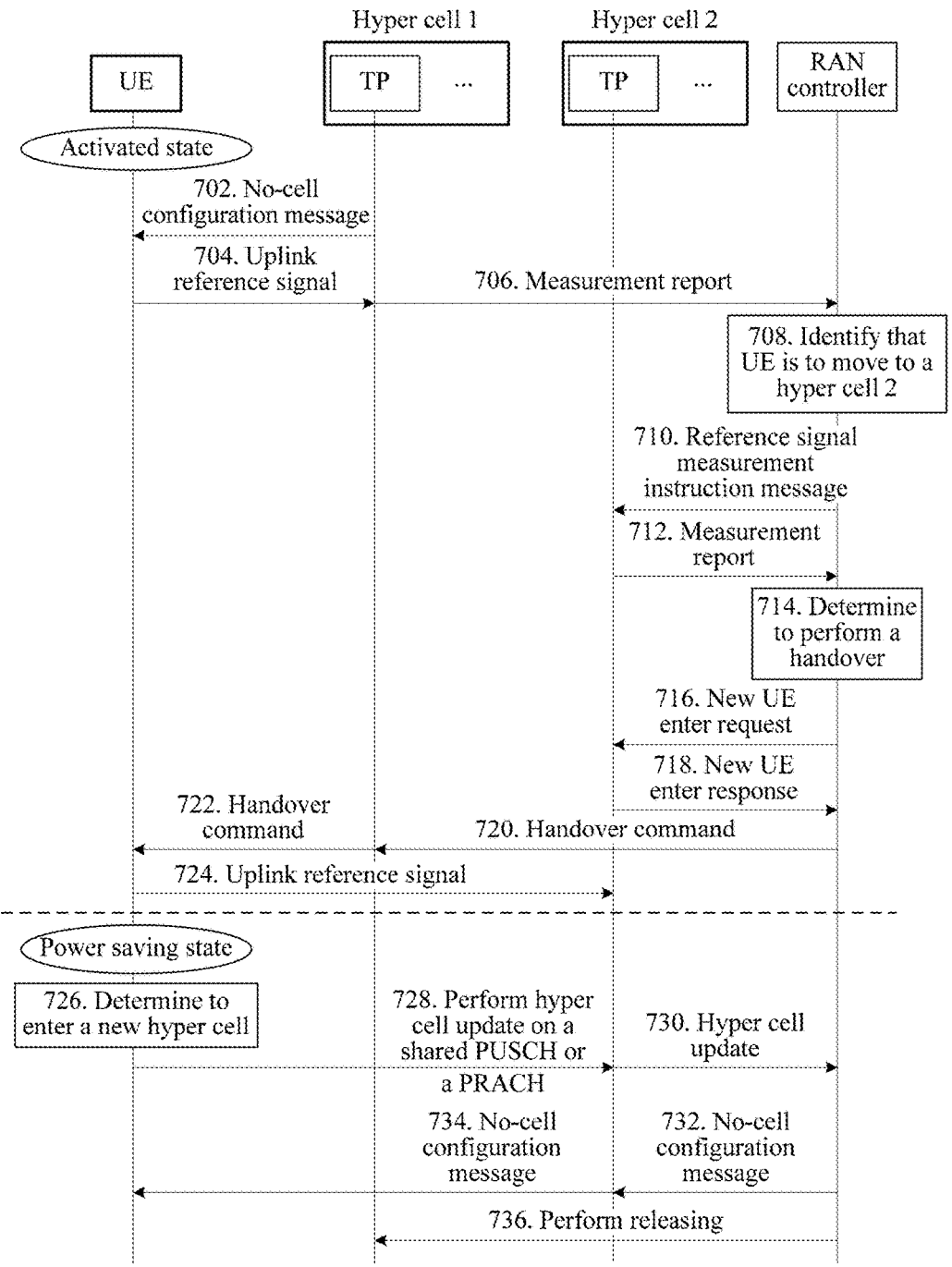
FIG. 7 is a schematic flowchart of a cell handover process applied to a hyper cell according to an embodiment of the present invention.

FIG. 7 is a schematic flowchart of a cell handover process applied to a hyper cell according to an embodiment of the present invention. It should be understood that FIG. 7 shows detailed communication steps or operations applied to the hyper cell. However, these steps or operations are merely an example. In this embodiment of the present invention, other operations or variations of operations in FIG. 7 may be further performed. In addition, steps in FIG. 7 may be performed in a sequence different from that presented in FIG. 7, and possibly not all operations in FIG. 7 need to be performed.

702. A hyper cell 1 sends a no-cell configuration message to UE.

In this case, the UE is located in the hyper cell 1, and the hyper cell 1 sends the no-cell configuration message to the UE. The message may be used to indicate that the UE works in a no-cell mode.

704 and 706. The UE sends an uplink reference signal, and a TP in the hyper cell 1 sends a measurement report for the uplink reference signal to a RAN controller.

These steps are similar to steps 220 and 222 in the foregoing, and details are not described herein again.

708. The RAN controller identifies, based on the measurement report from the TP in the hyper cell 1, that the UE is to move to a coverage area of a hyper cell 2.

For example, the RAN controller finds that one or more TPs in the hyper cell 1 that is or are close to the hyper cell 2 detects the uplink reference signal from the UE.

710. The RAN controller sends a reference signal measurement instruction message to a TP in the hyper cell 2.

The message may carry a dedicated user equipment identity of the UE in the hyper cell 1 and/or a reference signal configuration of the UE (may indicate a time-frequency resource and/or a signal sequence for the uplink reference signal sent by the UE in the hyper cell 1). Some TPs in the hyper cell 2 may be neighboring TPs of the TP in the hyper cell 1.

712. The TP in the hyper cell 2 measures the uplink reference signal from the UE, and reports a measurement result to the RAN controller.

The TP in the hyper cell 2 measures the uplink reference signal configured by the UE in the hyper cell 1, and when strength of the measured signal meets a measurement report triggering condition, for example, is greater than a specified threshold, reports the measurement result to the RAN controller. The measurement report triggering condition is included in the reference signal measurement instruction message.

714. Based on the measurement report from the TP in the hyper cell 2, the RAN controller determines that it is more suitable to transmit data in the hyper cell 2 when the UE has entered the coverage area of the hyper cell 2, and determines to perform a handover.

716. The RAN controller sends a new UE enter request to the TP in the hyper cell 2.

The new UE enter request may carry a dedicated user equipment identity of the UE in the hyper cell 2. The dedicated user equipment identity may be used to uniquely identify the UE in the hyper cell 2. A TP that receives the dedicated user equipment identity may provide a communications service for the UE.

718. The TP in the hyper cell 2 sends a new UE enter response to the RAN controller.

For example, the TP in the hyper cell 2 uses a response message to indicate that the TP accepts a request for the UE to enter the hyper cell 2.

720 and 722. The RAN controller sends a handover command to the UE by using the TP in the hyper cell 1.

The handover command may carry a dedicated user identity of the UE in the hyper cell 2. In an embodiment, the handover command may further include an initial TA value. In an embodiment, the RAN controller may further derive, for the UE, a key used by the UE to transmit data in the hyper cell 2, add the new key to the handover command, and send the new key to a data anchor corresponding to the hyper cell 2, so that the UE uses the new key in the hyper cell 2 to perform data security protection.

724. The UE sends the uplink reference signal in the hyper cell 2.

For example, after receiving the handover command, the UE may send the uplink reference signal by using a reference signal configuration corresponding to a new dedicated user equipment identity, so that the TP in the hyper cell 2 measures signal quality of the UE, and further the RAN controller may allocate, for the UE, a second TP set and a first TP used for the UE in the hyper cell 2.

The foregoing describes a process of handing over the UE in an activated state between hyper cells. There may be the following two manners for a handover process of the UE in a power saving state:

Manner 1: The UE identifies that the UE moves to a new hyper cell, and the UE itself initiates a handover process.

Manner 2: A network learns, through measurement, that the UE moves to a new hyper cell, and the network initiates a handover process.

For manner 1, refer to steps 726 to 736 in FIG. 7, and details are described as follows:

726. The UE determines to enter a new hyper cell 2.

728. The UE initiates a random access process to the TP in the hyper cell 2, or sends a hyper cell update message on a PUSCH shared between hyper cells, where the message may carry a dedicated user equipment identity of the UE in the hyper cell 1, and may further carry an identifier of the hyper cell 1.

730. The hyper cell 2 notifies the RAN controller that the UE initiates hyper cell update.

732 and 734. The RAN controller allocates, for the UE, a dedicated user equipment identity of the UE in the hyper cell 2, and sends the newly allocated dedicated user equipment identity to the UE by using a cell configuration message.

736. The RAN controller instructs the TP in the hyper cell 1 to release a related configuration of the UE.

Manner 2 and a process of the UE in the activated state are basically similar, and differ in that because the UE is in the power saving state, a handover command may be transferred by using a paging message. For details, refer to FIG. 8.

Figure 8:
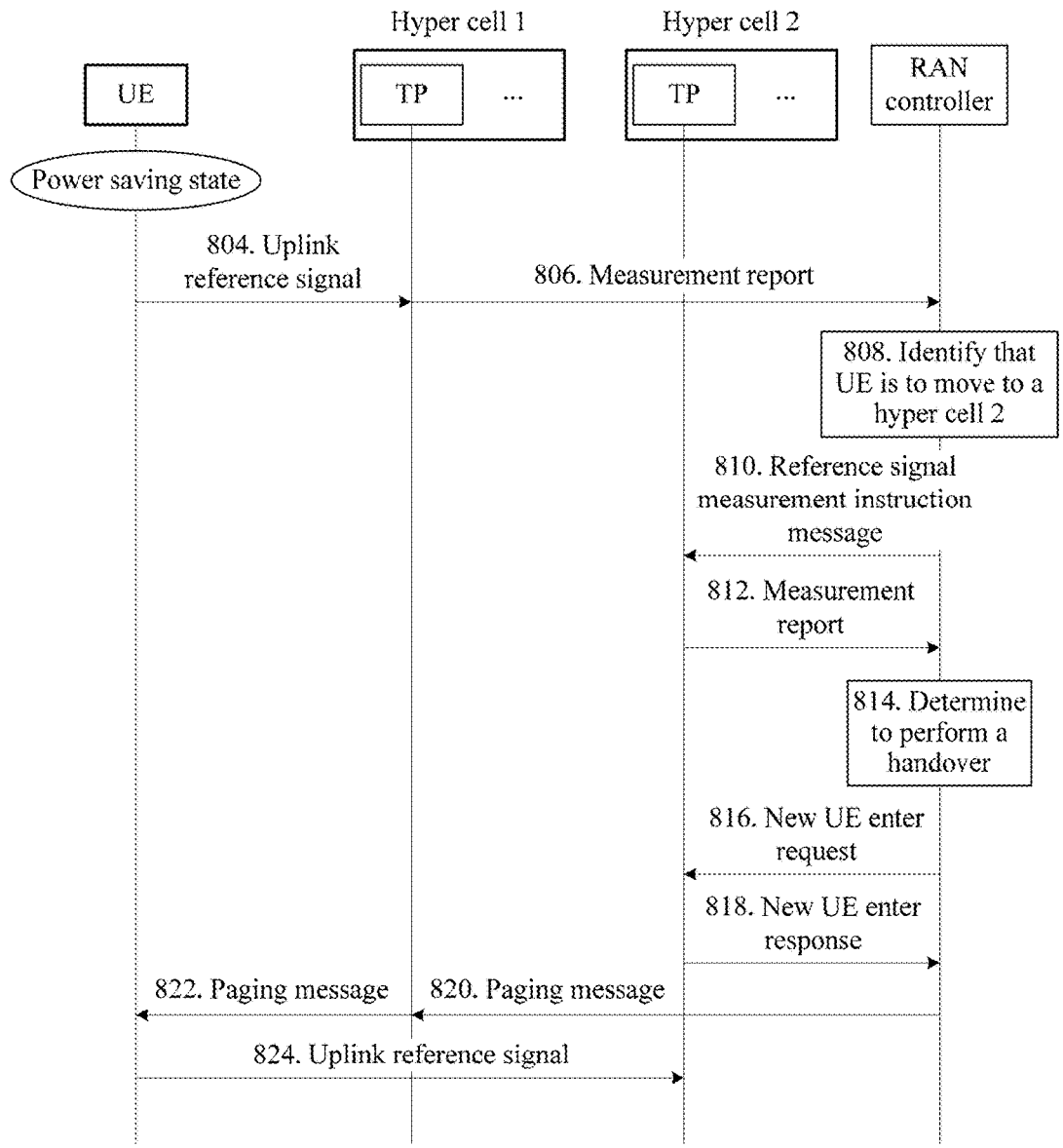
FIG. 8 is a schematic flowchart of a cell handover process applied to a hyper cell according to an embodiment of the present invention.

FIG. 8 is a schematic flowchart of a cell handover process applied to a hyper cell according to an embodiment of the present invention. It should be understood that FIG. 8 shows detailed communication steps or operations applied to the hyper cell. However, these steps or operations are merely an example. In this embodiment of the present invention, other operations or variations of operations in FIG. 8 may be further performed. In addition, steps in FIG. 8 may be performed in a sequence different from that presented in FIG. 8, and possibly not all operations in FIG. 8 need to be performed.

Steps 804 to 818 are similar to steps 704 to 718 in FIG. 7, and details are not described herein again.

820 and 822. The RAN controller sends a handover command to the UE by using a paging message.

The handover command may carry a dedicated user identity of the UE in the hyper cell 2. In an embodiment, the handover command may further include an initial TA value. In an embodiment, the RAN controller may further derive, for the UE, a key used by the UE to transmit data in the hyper cell 2, add the new key to the handover command, and send the new key to a data anchor corresponding to the hyper cell 2, so that the UE uses the new key in the hyper cell 2 to perform data security protection.

824. The UE sends the uplink reference signal in the hyper cell 2.

The foregoing details, with reference to FIG. 1 to FIG. 8, the method applied to the hyper cell according to the embodiments of the present invention. The following details, with reference to FIG. 9 to FIG. 14, a radio access network controller, UE, and a TP according to embodiments of the present invention.

Figure 9:
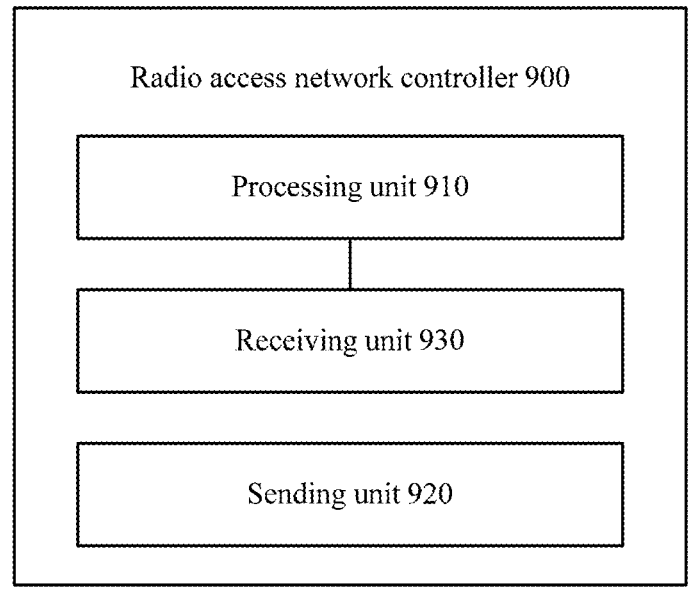
FIG. 9 is a schematic structural diagram of a radio access network controller according to an embodiment of the present invention.

FIG. 9 is a schematic structural diagram of a radio access network controller according to an embodiment of the present invention. It should be understood that the radio access network controller 900 in FIG. 9 can perform each step in FIG. 1 to FIG. 8 performed by the radio access network controller. To avoid repetition, details are not described herein again. The radio access network controller 900 includes:

a processing unit 910, configured to allocate a first transmission point TP set and a second TP set for user equipment UE in a first hyper cell, where the first hyper cell includes a plurality of TPs, the first TP set and the second TP set each include at least one of the plurality of TPs, a TP in the first TP set is configured to measure an uplink reference signal sent by the UE, and a TP in the second TP set is configured to perform data communication with the UE;

a sending unit 920, configured to send a first dedicated user equipment identity DUI to the UE, where the first DUI is used to identify the UE in the first hyper cell; and a receiving unit 930, configured to receive a measurement report sent by the TP in the first TP set allocated by the processing unit 910, where the measurement report carries signal strength information of the uplink reference signal sent by the UE.

The processing unit 910 is further configured to update the second TP set based on the measurement report from the TP in the first TP set that is received by the receiving unit 930.

In this embodiment of the present invention, mobility management is performed on the UE by sending the uplink reference signal by the UE and performing measurement by a network side, and the network side maintains and updates, for the UE, the second TP set used by the UE to perform data transmission (or data communication). This reduces UE load and difficulty in mobility management in a hotspot area.

Optionally, in an embodiment, the processing unit 910 is further configured to determine that a working mode of the UE is a no-cell mode. Working modes supported by the UE include a cell mode and the no-cell mode; and the cell mode is a working mode in which mobility management is performed based on downlink reference signal measurement performed by the UE, and the no-cell mode is a working mode in which mobility management is performed by measuring the uplink reference signal sent by the UE.

Optionally, in an embodiment, the processing unit 910 is specifically configured to: after the UE initiates a random access process by using a TP in the first hyper cell, receive request information sent by the TP in the first hyper cell, where the request information is used to request the radio access network controller 900 to determine the working mode of the UE, and the request information includes at least one of the following parameters of the UE: a type of the UE, a movement speed of the UE, a location of the UE, a service of the UE, the working modes supported by the UE, and a capability of the UE; and determine, based on the parameter of the UE that is carried in the request information, that the working mode of the UE is the no-cell working mode. The sending unit 920 is further configured to send, to the UE and the TP in the second TP set, information used to indicate that the working mode of the UE is the no-cell mode.

Optionally, in an embodiment, the processing unit 910 is further configured to determine, based on the measurement report from the TP in the first TP set, to change the working mode of the UE to the cell mode. The sending unit 920 is further configured to send a mode change message to the UE. The mode change message is used to instruct the UE to change from the no-cell mode to the cell mode, and the mode change message includes a cell identifier of a serving cell for the UE in the cell mode.

Optionally, in an embodiment, there is a correspondence between the first DUI and a time-frequency resource occupied by the uplink reference signal. The sending unit 920 is further configured to send the first DUI to the TP in the first TP set, so that the TP in the first TP set determines the time-frequency resource based on the first DUI and detects the uplink reference signal from the UE on the time-frequency resource.

Optionally, in an embodiment, the processing unit 910 is further configured to update the first TP set based on the measurement report from the TP in the first TP set.

Optionally, in an embodiment, the processing unit 910 is further configured to: after the UE enters a power saving state, continue to update the first TP set based on the measurement report from the TP in the first TP set, and skip updating the second TP set.

Optionally, in an embodiment, the processing unit 910 is further configured to: determine, based on the measurement report from the TP in the first TP set, that the UE arrives at an edge of a second hyper cell; instruct a TP in the second hyper cell to measure the uplink reference signal; and determine to hand over the UE to the second hyper cell based on a measurement report obtained by measuring the uplink reference signal by the TP in the second hyper cell. The sending unit 920 is further configured to send a handover command to the UE. The handover command is used to instruct to hand over the UE to the second hyper cell, the handover command includes a second DUI, and the second DUI is used to identify the UE in the second hyper cell.

Optionally, in an embodiment, the second TP set is a subset of the first TP set.

Optionally, in an embodiment, the first DUI is used by the TP in the first TP set to receive the uplink reference signal sent by the UE, and/or the first DUI is used to perform data communication between the TP in the second TP set and the UE.

Figure 10:
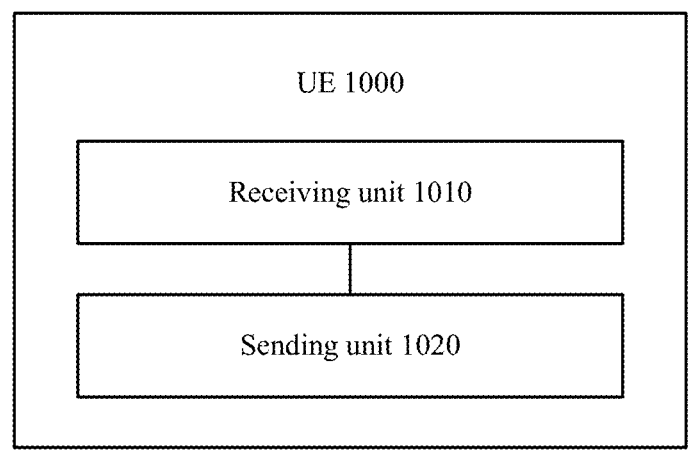
FIG. 10 is a schematic structural diagram of UE according to an embodiment of the present invention.

FIG. 10 is a schematic structural diagram of UE according to an embodiment of the present invention. It should be understood that the UE 1000 in FIG. 10 can implement each step in FIG. 1 to FIG. 8 performed by the UE. To avoid repetition, details are not described herein again. The UE 1000 includes:

a receiving unit 1010, configured to receive a first dedicated user equipment identity DUI allocated by a radio access network controller for the UE 1000, where the first hyper cell includes a plurality of transmission points TPs, the first DUI is used to identify the UE 1000 in the first hyper cell, the radio access network controller allocates, for the UE 1000, a first TP set and a second TP set from the plurality of TPs, a TP in the second TP set is configured to perform data communication with the UE 1000, and a TP in the first TP set is configured to measure an uplink reference signal sent by the UE 1000; and a sending unit 1020, configured to send an uplink reference signal based on the first DUI received by the receiving unit 1010, so that the radio access network controller updates the second TP set based on a measurement report obtained by measuring the uplink reference signal by the TP in the first TP set, where the measurement report carries signal strength information of the uplink reference signal sent by the UE 1000.

In this embodiment of the present invention, mobility management is performed on the UE by sending the uplink reference signal by the UE and performing measurement by a network side, and the network side maintains and updates, for the UE, the second TP set used by the UE to perform data transmission (or data communication). This reduces UE load and difficulty in mobility management in a hotspot area.

Optionally, in an embodiment, a working mode of the UE 1000 is a no-cell mode. Working modes supported by the UE 1000 includes a cell mode and the no-cell mode. The cell mode is a working mode in which mobility management is performed based on downlink reference signal measurement performed by the UE 1000, and the no-cell mode is a working mode in which mobility management is performed by measuring the uplink reference signal sent by the UE 1000.

Optionally, in an embodiment, the sending unit 1020 is further configured to: after the UE 1000 initiates a random access process by using a TP in the first hyper cell, send a parameter of the UE 1000 to the TP in the first hyper cell, so that the TP in the first hyper cell sends the parameter of the UE 1000 to the radio access network controller, and the radio network controller determines the working mode of the UE 1000 based on the parameter of the UE 1000. The parameter of the UE 1000 includes at least one of a type of the UE 1000, a movement speed of the UE 1000, a location of the UE 1000, a service of the UE 1000, the working modes supported by the UE 1000, and a capability of the UE 1000. The receiving unit 1010 is further configured to receive information that is sent by the radio access network controller and that is used to indicate that the working mode of the UE 1000 is the no-cell mode.

Optionally, in an embodiment, the receiving unit 1010 is further configured to receive a mode change message sent by the radio access network controller. The mode change message is used to instruct the UE 1000 to change from the no-cell mode to the cell mode, and the mode change message includes a cell identifier of a serving cell for the UE 1000 in the cell mode. The UE 1000 further includes: a determining unit, configured to determine the serving cell based on the cell identifier; and a data transmission unit, configured to perform data transmission by using the serving cell.

Optionally, in an embodiment, there is a correspondence between the first DUI and a time-frequency resource occupied by the uplink reference signal. The UE 1000 further includes: a determining unit, configured to determine the time-frequency resource based on the first DUI by using the correspondence. The sending unit 1020 is specifically configured to send the uplink reference signal on the time-frequency resource.

Optionally, in an embodiment, the receiving unit 1010 is further configured to receive a handover command sent by the radio access network controller. The handover command is used to instruct to hand over the UE 1000 to a second hyper cell, the handover command includes a second DUI, and the second DUI is used to identify the UE 1000 in the second hyper cell.

Optionally, in an embodiment, the second TP set is a subset of the first TP set.

Optionally, in an embodiment, the first DUI is used by the TP in the first TP set to receive the uplink reference signal sent by the UE 1000, and/or the first DUI is used to perform data communication between the TP in the second TP set and the UE 1000.

Figure 11:
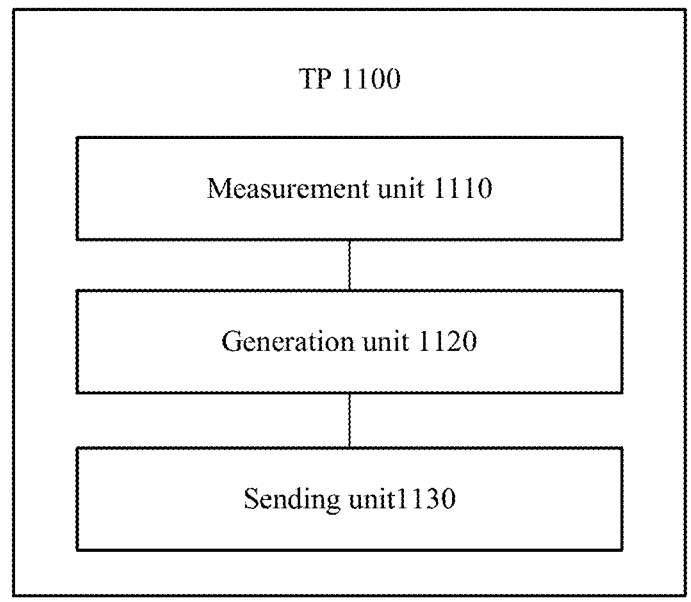
FIG. 11 is a schematic structural diagram of a TP according to an embodiment of the present invention.

FIG. 11 is a schematic structural diagram of a TP according to an embodiment of the present invention. The TP 1100 in FIG. 11 can implement each step in FIG. 1 to FIG. 8 performed by the TP. To avoid repetition, details are not described herein again. The TP 1100 includes:

a measurement unit 1110, configured to measure an uplink reference signal sent by the UE, where the first hyper cell includes a plurality of TPs, a radio access network controller allocates a first dedicated user equipment identity DUI for the UE in the first hyper cell and allocates, for the UE, a first TP set and a second TP set from the plurality of TPs, the first DUI is used to identify the UE in the first hyper cell, a TP in the first TP set is configured to measure the uplink reference signal sent by the UE, a TP in the second TP set is configured to perform data communication with the UE, and the TP 1100 is a TP in the first TP set;

a generation unit 1120, configured to generate a measurement report based on a result of measuring, by the measurement unit 1110, the uplink reference signal sent by the UE, where the measurement report carries signal strength information of the uplink reference signal that is sent by the UE and that is measured by the TP 1100; and a sending unit 1130, configured to send the measurement report generated by the generation unit 1120 to the radio access network controller, so that the radio access network controller updates the second TP set based on the measurement report.

In this embodiment of the present invention, mobility management is performed on the UE by sending the uplink reference signal by the UE and performing measurement by a network side, and the network side maintains and updates, for the UE, the second TP set used by the UE to perform data transmission (or data communication). This reduces UE load and difficulty in mobility management in a hotspot area.

Optionally, in an embodiment, a working mode of the UE is a no-cell mode. Working modes supported by the UE include a cell mode and the no-cell mode; and the cell mode is a working mode in which mobility management is performed based on downlink reference signal measurement performed by the UE, and the no-cell mode is a working mode in which mobility management is performed by measuring the uplink reference signal sent by the UE.

Optionally, in an embodiment, the TP 1100 further includes: a receiving unit, configured to: after the UE initiates a random access process by using the TP 1100, receive a parameter of the UE from the UE. The parameter of the UE includes at least one of a type of the UE, a movement speed of the UE, a location of the UE, a service of the UE, the working modes supported by the UE, and a capability of the UE. The sending unit 1130 is further configured to send the parameter of the UE to the radio access network controller, so that the radio access network controller determines the working mode of the UE based on the parameter of the UE. The receiving unit is further configured to receive information that is sent by the radio access network controller and that is used to indicate that the working mode of the UE is the no-cell mode.

Optionally, in an embodiment, there is a correspondence between the first DUI and a time-frequency resource occupied by the uplink reference signal. The receiving unit is further configured to receive the first DUI sent by the radio access network controller. The measurement unit 1110 is specifically configured to: determine the time-frequency resource based on the first DUI by using the correspondence; and detect the uplink reference signal on the time-frequency resource.

Optionally, in an embodiment, the TP 1100 is a TP in the second TP set, and the TP 1100 further includes: the receiving unit, configured to receive the first DUI sent by the radio network controller; and a data communication unit, configured to perform data communication with the UE based on the first DUI.

Optionally, in an embodiment, the data communication unit is specifically configured to receive downlink data of the UE from a data anchor, where the data anchor is configured to encrypt the downlink data of the UE; and send, to the UE, the downlink data encrypted by using the data anchor.

Optionally, in an embodiment, the TP 1100 further includes: the receiving unit, configured to receive a notification message sent by the radio access network controller, where the notification message is used to notify that the TP 1100 has been deleted from the second TP used for the UE; and a determining unit, configured to determine whether there is downlink data of the UE that is not sent successfully. The sending unit 1130 is specifically configured to: when there is the downlink data not sent successfully, send, to the data anchor, the downlink data not sent successfully, so that the data anchor forwards, to the UE by using another TP in the second TP set, the downlink data not sent successfully.

Optionally, in an embodiment, the second TP set is a subset of the first TP set.

Optionally, in an embodiment, the first DUI is used by the TP in the first TP set to receive the uplink reference signal sent by the UE, and/or the first DUI is used to perform data communication between the TP in the second TP set and the UE.

Figure 12:
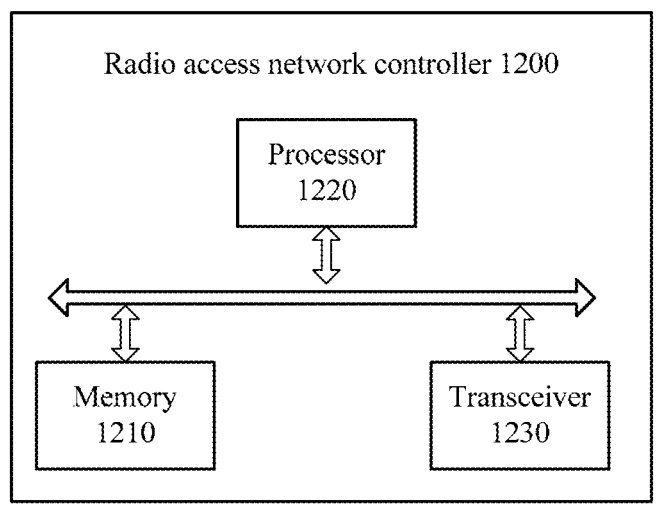
FIG. 12 is a schematic structural diagram of a radio access network controller according to an embodiment of the present invention.

FIG. 12 is a schematic structural diagram of a radio access network controller according to an embodiment of the present invention. It should be understood that the radio access network controller 1200 in FIG. 12 can perform each step in FIG. 1 to FIG. 8 performed by the radio access network controller. To avoid repetition, details are not described herein again. The radio access network controller 1200 includes:

a memory 1210, configured to store a program;

a processor 1220, configured to: execute a program in the memory 1210, and when the program is executed, allocate, by the processor 1220, a first transmission point TP set and a second TP set for user equipment UE in a first hyper cell, where the first hyper cell includes a plurality of TPs, the first TP set and the second TP set each include at least one of the plurality of TPs, a TP in the first TP set is configured to measure an uplink reference signal sent by the UE, and a TP in the second TP set is configured to perform data communication with the UE; and a transceiver 1230, configured to: send a first dedicated user equipment identity DUI to the UE, where the first DUI is used to identify the UE in the first hyper cell; and receive a measurement report sent by the TP in the first TP set allocated by the processor 1220, where the measurement report carries signal strength information of the uplink reference signal sent by the UE.

The processor 1220 is further configured to update the second TP set based on the measurement report from the TP in the first TP set that is received by the transceiver 1230.

In this embodiment of the present invention, mobility management is performed on the UE by sending the uplink reference signal by the UE and performing measurement by a network side, and the network side maintains and updates, for the UE, the second TP set used by the UE to perform data transmission (or data communication). This reduces UE load and difficulty in mobility management in a hotspot area.

Optionally, in an embodiment, the processor 1220 is further configured to determine that a working mode of the UE is a no-cell mode. Working modes supported by the UE include a cell mode and the no-cell mode; and the cell mode is a working mode in which mobility management is performed based on downlink reference signal measurement performed by the UE, and the no-cell mode is a working mode in which mobility management is performed by measuring the uplink reference signal sent by the UE.

Optionally, in an embodiment, the processor 1220 is specifically configured to: after the UE initiates a random access process by using a TP in the first hyper cell, receive request information sent by the TP in the first hyper cell, where the request information is used to request the radio access network controller 1200 to determine the working mode of the UE, and the request information includes at least one of the following parameters of the UE: a type of the UE, a movement speed of the UE, a location of the UE, a service of the UE, the working modes supported by the UE, and a capability of the UE; and determine, based on the parameter of the UE that is carried in the request information, that the working mode of the UE is the no-cell working mode. The transceiver 1230 is further configured to send, to the UE and the TP in the second TP set, information used to indicate that the working mode of the UE is the no-cell mode.

Optionally, in an embodiment, the processor 1220 is further configured to determine, based on the measurement report from the TP in the first TP set, to change the working mode of the UE to the cell mode. The transceiver 1230 is further configured to send a mode change message to the UE. The mode change message is used to instruct the UE to change from the no-cell mode to the cell mode, and the mode change message includes a cell identifier of a serving cell for the UE in the cell mode.

Optionally, in an embodiment, there is a correspondence between the first DUI and a time-frequency resource occupied by the uplink reference signal. The transceiver 1230 is further configured to send the first DUI to the TP in the first TP set, so that the TP in the first TP set determines the time-frequency resource based on the first DUI and detects the uplink reference signal from the UE on the time-frequency resource.

Optionally, in an embodiment, the processor 1220 is further configured to update the first TP set based on the measurement report from the TP in the first TP set.

Optionally, in an embodiment, the processor 1220 is further configured to: after the UE enters a power saving state, continue to update the first TP set based on the measurement report from the TP in the first TP set, and skip updating the second TP set.

Optionally, in an embodiment, the processor 1220 is further configured to: determine, based on the measurement report from the TP in the first TP set, that the UE arrives at an edge of a second hyper cell; instruct a TP in the second hyper cell to measure the uplink reference signal; and determine to hand over the UE to the second hyper cell based on a measurement report obtained by measuring the uplink reference signal by the TP in the second hyper cell. The transceiver 1230 is further configured to send a handover command to the UE. The handover command is used to instruct to hand over the UE to the second hyper cell, the handover command includes a second DUI, and the second DUI is used to identify the UE in the second hyper cell.

Optionally, in an embodiment, the second TP set is a subset of the first TP set.

Optionally, in an embodiment, the first DUI is used by the TP in the first TP set to receive the uplink reference signal sent by the UE, and/or the first DUI is used to perform data communication between the TP in the second TP set and the UE.

Figure 13:
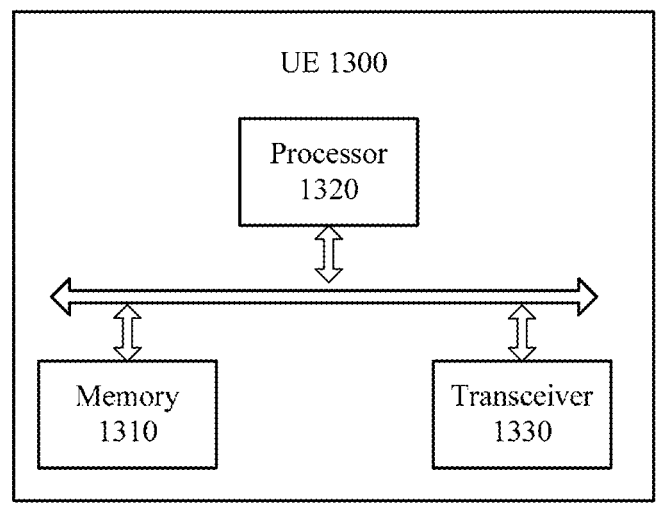
FIG. 13 is a schematic structural diagram of UE according to an embodiment of the present invention.

FIG. 13 is a schematic structural diagram of UE according to an embodiment of the present invention. The UE 1300 in FIG. 13 can implement each step in FIG. 1 to FIG. 8 performed by the UE. To avoid repetition, details are not described herein again. The UE 1300 includes:

a memory 1310, configured to store a program;

a processor 1320, configured to execute the program stored in the memory 1310, and when the program is executed, control, by the processor 1320, the transceiver 1330 to receive and send information; and the transceiver 1330, configured to: receive a first dedicated user equipment identity DUI allocated by a radio access network controller for the UE 1300, where the first hyper cell includes a plurality of transmission points TPs, the first DUI is used to identify the UE 1300 in the first hyper cell, the radio access network controller allocates, for the UE 1300, a first TP set and a second TP set from the plurality of TPs, a TP in the second TP set is configured to perform data communication with the UE 1300, and a TP in the first TP set is configured to measure an uplink reference signal sent by the UE 1300; and send an uplink reference signal based on the DUI, so that the radio access network controller updates the second TP set based on a measurement report obtained by measuring the uplink reference signal by the TP in the first TP set, where the measurement report carries signal strength information of the uplink reference signal sent by the UE 1300.

In this embodiment of the present invention, mobility management is performed on the UE by sending the uplink reference signal by the UE and performing measurement by a network side, and the network side maintains and updates, for the UE, the second TP set used by the UE to perform data transmission (or data communication). This reduces UE load and difficulty in mobility management in a hotspot area.

Optionally, in an embodiment, a working mode of the UE 1300 is a no-cell mode. Working modes supported by the UE 1300 includes a cell mode and the no-cell mode. The cell mode is a working mode in which mobility management is performed based on downlink reference signal measurement performed by the UE 1300, and the no-cell mode is a working mode in which mobility management is performed by measuring the uplink reference signal sent by the UE 1300.

Optionally, in an embodiment, the transceiver 1330 is further configured to: after the UE 1300 initiates a random access process by using a TP in the first hyper cell, send a parameter of the UE 1300 to the TP in the first hyper cell, so that the TP in the first hyper cell sends the parameter of the UE 1300 to the radio access network controller, and the radio network controller determines the working mode of the UE 1300 based on the parameter of the UE 1300. The parameter of the UE 1300 includes at least one of a type of the UE 1300, a movement speed of the UE 1300, a location of the UE 1300, a service of the UE 1300, the working modes supported by the UE 1300, and a capability of the UE 1300. The transceiver 1330 is further configured to receive information that is sent by the radio access network controller and that is used to indicate that the working mode of the UE 1300 is the no-cell mode.

Optionally, in an embodiment, the transceiver 1330 is further configured to receive a mode change message sent by the radio access network controller. The mode change message is used to instruct the UE 1300 to change from the no-cell mode to the cell mode, and the mode change message includes a cell identifier of a serving cell for the UE in the cell mode 1300. The processor 1320 is further configured to: determine the serving cell based on the cell identifier; and perform data transmission by using the serving cell.

Optionally, in an embodiment, there is a correspondence between the first DUI and a time-frequency resource occupied by the uplink reference signal. The processor 1320 is further configured to determine the time-frequency resource based on the first DUI by using the correspondence. The transceiver 1330 is specifically configured to send the uplink reference signal on the time-frequency resource.

Optionally, in an embodiment, the transceiver 1330 is further configured to receive a handover command sent by the radio access network controller. The handover command is used to instruct to hand over the UE 1300 to a second hyper cell, the handover command includes a second DUI, and the second DUI is used to identify the UE 1300 in the second hyper cell.

Optionally, in an embodiment, the second TP set is a subset of the first TP set.

Optionally, in an embodiment, the first DUI is used by the TP in the first TP set to receive the uplink reference signal sent by the UE 1300, and/or the first DUI is used to perform data communication between the TP in the second TP set and the UE 1300.

Figure 14:
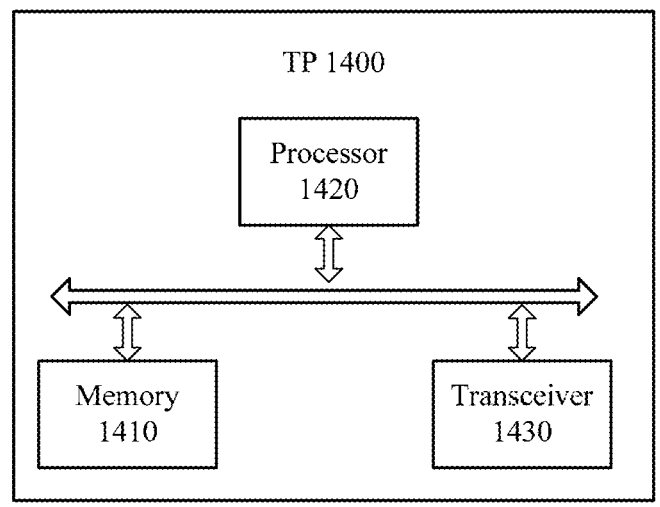
FIG. 14 is a schematic structural diagram of a TP according to an embodiment of the present invention.

FIG. 14 is a schematic structural diagram of a TP according to an embodiment of the present invention. The TP 1400 in FIG. 14 can implement each step in FIG. 1 to FIG. 8 performed by the TP. To avoid repetition, details are not described herein again. The TP 1400 includes:

a memory 1410, configured to store a program;

a processor 1420, configured to: execute a program stored by the memory 1410, and when the program is executed, measure, by the processor 1420, an uplink reference signal sent by a UE, where the first hyper cell includes a plurality of TPs, a radio access network controller allocates a first dedicated user equipment identity DUI for the UE in the first hyper cell and allocates, for the UE, a first TP set and a second TP set from the plurality of TPs, the first DUI is used to identify the UE in the first hyper cell, a TP in the first TP set is configured to measure the uplink reference signal sent by the UE, a TP in the second TP set is configured to perform data communication with the UE, and the TP 1400 is a TP in the first TP set; and generate a measurement report based on a result of measuring the uplink reference signal sent by the UE, where the measurement report carries signal strength information of the uplink reference signal that is sent by the UE and that is measured by the TP 1400; and a transceiver 1430, configured to send the measurement report to the radio access network controller, so that the radio access network controller updates the second TP set based on the measurement report.

In this embodiment of the present invention, mobility management is performed on the UE by sending the uplink reference signal by the UE and performing measurement by a network side, and the network side maintains and updates, for the UE, the second TP set used by the UE to perform data transmission (or data communication). This reduces UE load and difficulty in mobility management in a hotspot area.

Optionally, in an embodiment, a working mode of the UE is a no-cell mode. Working modes supported by the UE include a cell mode and the no-cell mode; and the cell mode is a working mode in which mobility management is performed based on downlink reference signal measurement performed by the UE, and the no-cell mode is a working mode in which mobility management is performed by measuring the uplink reference signal sent by the UE.

Optionally, in an embodiment, the transceiver 1430 is further configured to: after the UE initiates a random access process by using the TP 1400, receive a parameter of the UE from the UE. The parameter of the UE includes at least one of a type of the UE, a movement speed of the UE, a location of the UE, a service of the UE, the working modes supported by the UE, and a capability of the UE. The transceiver 1430 is further configured to send the parameter of the UE to the radio access network controller, so that the radio access network controller determines the working mode of the UE based on the parameter of the UE; and receive information that is sent by the radio access network controller and that is used to indicate that the working mode of the UE is the no-cell mode.

Optionally, in an embodiment, there is a correspondence between the first DUI and a time-frequency resource occupied by the uplink reference signal. The transceiver 1430 is further configured to receive the first DUI sent by the radio access network controller. The processor 1420 is specifically configured to: determine the time-frequency resource based on the first DUI by using the correspondence; and detect the uplink reference signal on the time-frequency resource.

Optionally, in an embodiment, the TP 1400 is a TP in the second TP set. The transceiver 1430 is further configured to: receive the first DUI sent by the radio network controller; and perform data communication with the UE based on the first DUI.

Optionally, in an embodiment, the transceiver 1430 is specifically configured to receive downlink data of the UE from a data anchor, where the data anchor is configured to encrypt the downlink data of the UE; and send, to the UE, the downlink data encrypted by using the data anchor.

Optionally, in an embodiment, the transceiver 1430 is further configured to receive a notification message sent by the radio access network controller. The notification message is used to notify that the TP 1400 has been deleted from the second TP used for the UE. The processor 1420 is further configured to determine whether there is downlink data of the UE that is not sent successfully. The transceiver 1430 is specifically configured to: when there is the downlink data not sent successfully, send, to the data anchor, the downlink data not sent successfully, so that the data anchor forwards, to the UE by using another TP in the second TP set, the downlink data not sent successfully.

Optionally, in an embodiment, the second TP set is a subset of the first TP set.

Optionally, in an embodiment, the first DUI is used by the TP in the first TP set to receive the uplink reference signal sent by the UE, and/or the first DUI is used to perform data communication between the TP in the second TP set and the UE.

Figure 15:
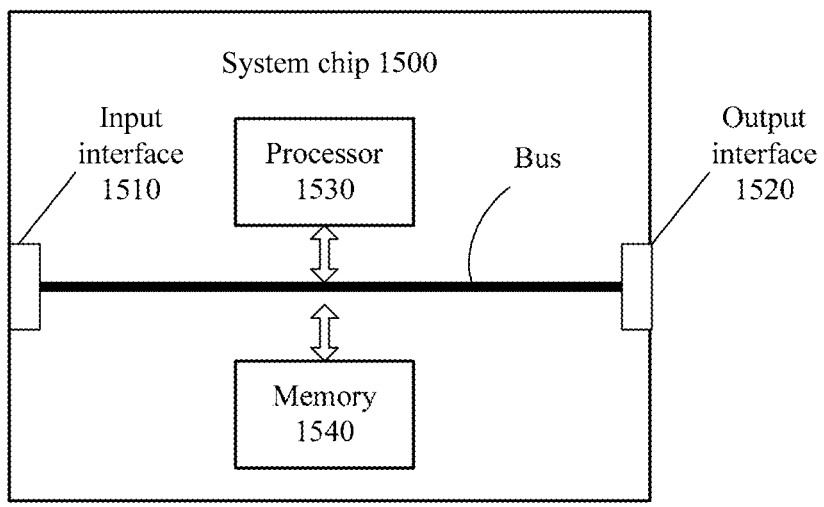
FIG. 15 is a schematic structural diagram of a system chip according to an embodiment of the present invention.

FIG. 15 is a schematic structural diagram of a system chip according to an embodiment of the present invention. The system chip 1500 in FIG. 15 includes an input interface 1510, an output interface 1520, at least one processor 1530, and a memory 1540. The input interface 1510, the output interface 1520, the processor 1530, and the memory 1540 are connected by using a bus, the processor 1530 is configured to execute code in the memory 1540, and when the code is executed, the processor 1530 implements the method in FIG. 1 to FIG. 8 performed by the radio access network controller.

Figure 16:
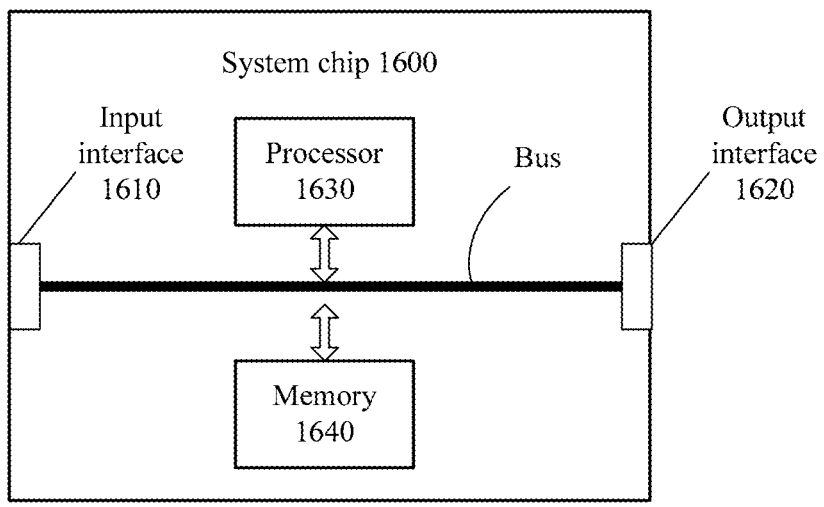
FIG. 16 is a schematic structural diagram of a system chip according to an embodiment of the present invention.

FIG. 16 is a schematic structural diagram of a system chip according to an embodiment of the present invention. The system chip 1600 in FIG. 16 includes an input interface 1610, an output interface 1620, at least one processor 1630, and a memory 1640. The input interface 1610, the output interface 1620, the processor 1630, and the memory 1640 are connected by using a bus, the processor 1630 is configured to execute code in the memory 1640, and when the code is executed, the processor 1630 implements the method in FIG. 1 to FIG. 8 performed by the UE.

Figure 17:
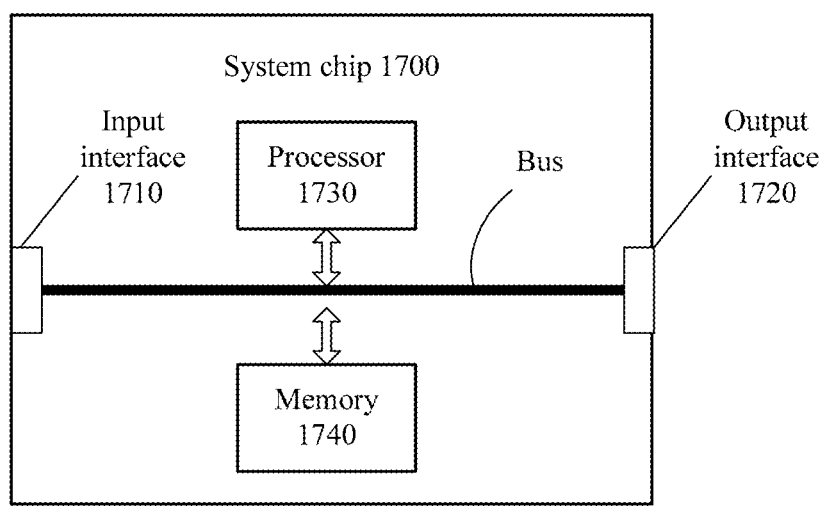
FIG. 17 is a schematic structural diagram of a system chip according to an embodiment of the present invention.

FIG. 17 is a schematic structural diagram of a system chip according to an embodiment of the present invention. The system chip 1700 in FIG. 17 includes an input interface 1710, an output interface 1720, at least one processor 1730, and a memory 1740. The input interface 1710, the output interface 1720, the processor 1730, and the memory 1740 are connected by using a bus, the processor 1730 is configured to execute code in the memory 1740, and when the code is executed, the processor 1730 implements the method in FIG. 1 to FIG. 8 performed by the TP.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method applied to a hyper cell, the method comprising:

allocating, by a radio access network controller, a first transmission point (TP) set and a second TP set for a mobile device in a first hyper cell, wherein the first hyper cell comprises a plurality of TPs, the first TP set and the second TP set each comprise at least one of the plurality of TPs, a TP in the first TP set is configured to measure an uplink reference signal sent by the mobile device, and a TP in the second TP set is configured to perform data communication with the mobile device;

sending, by the radio access network controller, a first dedicated user equipment identity (DUI) to the mobile device for identifying the mobile device in the first hyper cell;

receiving, by the radio access network controller, a measurement report sent by the TP in the first TP set, wherein the measurement report carries signal strength information of the uplink reference signal sent by the mobile device; and updating, by the radio access network controller, the second TP set based on the measurement report from the TP in the first TP set.

2. The method according to claim 1, wherein before allocating, by a radio access network controller, a first TP set and a second TP set for mobile device in a first hyper cell, the method further comprises:

determining, by the radio access network controller, that a working mode of the mobile device is a no-cell mode, wherein working modes supported by the mobile device comprise a cell mode and the no-cell mode, and the cell mode is a working mode in which mobility management is performed based on downlink reference signal measurement performed by the mobile device, and the no-cell mode is a working mode in which mobility management is performed by measuring the uplink reference signal sent by the mobile device.

3. The method according to claim 2, wherein:

determining, by the radio access network controller, that a working mode of the mobile device is a no-cell mode comprises:

after the mobile device initiates a random access process by using a TP in the first hyper cell, receiving, by the radio access network controller, request information sent by the TP in the first hyper cell, wherein the request information is used to request the radio access network controller to determine the working mode of the mobile device, and the request information comprises at least one of the following parameters of the mobile device: a type of the mobile device, a movement speed of the mobile device, a location of the mobile device, a service of the mobile device, the working modes supported by the mobile device, and a capability of the mobile device, and determining, by the radio access network controller based on the parameter of the mobile device that is carried in the request information, that the working mode of the mobile device is the no-cell working mode; and the method further comprises:

sending, by the radio access network controller to the mobile device and the TP in the second TP set, information for indicating that the working mode of the mobile device is the no-cell mode.

4. The method according to claim 2, further comprising:

determining, by the radio access network controller based on the measurement report from the TP in the first TP set, to change the working mode of the mobile device to the cell mode; and sending, by the radio access network controller, a mode change message to the mobile device for instructing the mobile device to change from the no-cell mode to the cell mode, and the mode change message comprises a cell identifier of a serving cell for the mobile device in the cell mode.

5. The method according to claim 1, wherein:

there is a correspondence between the first DUI and a time-frequency resource occupied by the uplink reference signal; and the method further comprises:

sending, by the radio access network controller, the first DUI to the TP in the first TP set, for enabling the TP in the first TP set to determine the time-frequency resource based on the first DUI and to detect the uplink reference signal from the mobile device on the time-frequency resource.

6. The method according to claim 1, further comprising:

updating, by the radio access network controller, the first TP set based on the measurement report from the TP in the first TP set.

7. The method according to claim 6, further comprising:

after the mobile device enters a power saving state, continuing, by the radio access network controller, to update the first TP set based on the measurement report from the TP in the first TP set, and skipping updating the second TP set.

8. The method according to claim 1, further comprising:

determining, by the radio access network controller based on the measurement report from the TP in the first TP set, that the mobile device arrives at an edge of a second hyper cell;

instructing, by the radio access network controller, a TP in the second hyper cell to measure the uplink reference signal;

determining, by the radio access network controller, to hand over the mobile device to the second hyper cell based on a measurement report obtained by measuring the uplink reference signal by the TP in the second hyper cell; and sending, by the radio access network controller, a handover command to the mobile device for instructing to hand over the mobile device to the second hyper cell, the handover command comprises a second DUI for identifying the mobile device in the second hyper cell.

9. The method according to claim 1, wherein the second TP set is a subset of the first TP set.

10. The method according to claim 1, wherein the first DUI is used by the TP in the first TP set to receive the uplink reference signal sent by the mobile device, and/or the first DUI is used to perform data communication between the TP in the second TP set and the mobile device.

11. A radio access network controller, comprising:

a processor, configured to allocate a first transmission point (TP) set and a second TP set for a mobile device in a first hyper cell, wherein the first hyper cell comprises a plurality of TPs, the first TP set and the second TP set each comprise any one or any combination of the plurality of TPs, a TP in the first TP set is configured to measure an uplink reference signal sent by the mobile device, or a TP in the second TP set is configured to perform data communication with the mobile device;

a transceiver, configured to:

send a first dedicated user equipment identity (DUI) to the mobile device for identifying the mobile device in the first hyper cell, and receive a measurement report sent by the TP in the first TP set allocated by the processor, wherein the measurement report carries signal strength information of the uplink reference signal sent by the mobile device; and wherein the processor is further configured to update the second TP set based on the measurement report from the TP in the first TP set that is received by the transceiver.

12. The radio access network controller according to claim 11, wherein the processor is further configured to:

determine that a working mode of the mobile device is a no-cell mode, wherein working modes supported by the mobile device comprise a cell mode and the no-cell mode, and the cell mode is a working mode in which mobility management is performed based on downlink reference signal measurement performed by the mobile device, and the no-cell mode is a working mode in which mobility management is performed by measuring the uplink reference signal sent by the mobile device.

13. The radio access network controller according to claim 12, wherein:

the processor is configured to:
after the mobile device initiates a random access process by using a TP in the first hyper cell, receive request information sent by the TP in the first hyper cell, wherein the request information is used to request the radio access network controller to determine the working mode of the mobile device, and the request information comprises any one or nay combination of the following parameters of the mobile device: a type of the mobile device, a movement speed of the mobile device, a location of the mobile device, a service of the mobile device, the working modes supported by the mobile device, or a capability of the mobile device; and determine, based on the parameter of the mobile device that is carried in the request information, that the working mode of the mobile device is the no-cell working mode; and the transceiver is further configured to:
send, to the mobile device and the TP in the second TP set, information for indicating that the working mode of the mobile device is the no-cell mode.

14. The radio access network controller according to claim 12, wherein:

the processor is further configured to determine, based on the measurement report from the TP in the first TP set, to change the working mode of the mobile device to the cell mode; and the transceiver is further configured to send a mode change message to the mobile device for instructing the mobile device to change from the no-cell mode to the cell mode, and the mode change message comprises a cell identifier of a serving cell for the mobile device in the cell mode.

15. The radio access network controller according to claim 11, wherein:

there is a correspondence between the first DUI and a time-frequency resource occupied by the uplink reference signal; and the transceiver is further configured to send the first DUI to the TP in the first TP set, for enabling the TP in the first TP set to determine the time-frequency resource based on the first DUI and to detect the uplink reference signal from the mobile device on the time-frequency resource.

16. The radio access network controller according to claim 11, wherein the processor is further configured to update the first TP set based on the measurement report from the TP in the first TP set.

17. The radio access network controller according to claim 16, wherein the processor is further configured to: after the mobile device enters a power saving state, continue to update the first TP set based on the measurement report from the TP in the first TP set, and skip updating the second TP set.

18. The radio access network controller according to claim 11, wherein:

the processor is further configured to:
determine, based on the measurement report from the TP in the first TP set, that the mobile device arrives at an edge of a second hyper cell,
instruct a TP in the second hyper cell to measure the uplink reference signal, and
determine to hand over the mobile device to the second hyper cell based on a measurement report obtained by measuring the uplink reference signal by the TP in the second hyper cell; and the transceiver is further configured to send a handover command to the mobile device for instructing to hand over the mobile device to the second hyper cell, the handover command comprises a second DUI for identifying the mobile device in the second hyper cell.

19. The radio access network controller according to claim 11, wherein the second TP set is a subset of the first TP set.

20. The radio access network controller according to claim 19, wherein the first DUI is used by the TP in the first TP set to receive the uplink reference signal sent by the mobile device, and/or the first DUI is used to perform data communication between the TP in the second TP set and the mobile device.

* * * * *